United States Patent
Imine

(10) Patent No.: US 11,743,395 B2
(45) Date of Patent: Aug. 29, 2023

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Ryotaro Imine, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 17/076,387

(22) Filed: Oct. 21, 2020

(65) Prior Publication Data
US 2021/0124986 A1    Apr. 29, 2021

(30) Foreign Application Priority Data
Oct. 29, 2019   (JP) ................................ 2019-196658

(51) Int. Cl.
| | |
|---|---|
| H04N 1/00 | (2006.01) |
| G06N 20/00 | (2019.01) |
| G06F 18/21 | (2023.01) |
| G06V 30/40 | (2022.01) |
| G06V 30/19 | (2022.01) |
| G06V 30/10 | (2022.01) |

(52) U.S. Cl.
CPC ......... *H04N 1/00127* (2013.01); *G06F 18/21* (2023.01); *G06N 20/00* (2019.01); *G06V 30/19133* (2022.01); *G06V 30/40* (2022.01); *G06V 30/10* (2022.01)

(58) Field of Classification Search
CPC combination set(s) only.
See application file for complete search history.

(56) References Cited

U.S. PATENT DOCUMENTS

| | | | | |
|---|---|---|---|---|
| 11,055,642 | B1* | 7/2021 | Mossoba | G06Q 10/0631 |
| 11,106,524 | B1* | 8/2021 | Csabi | G06F 11/079 |
| 11,494,693 | B2* | 11/2022 | Pezzillo | H04L 67/10 |
| 2013/0166657 | A1* | 6/2013 | Tadayon | G06Q 10/107 |
| | | | | 709/206 |
| 2018/0270367 | A1* | 9/2018 | Suzuki | H04N 1/00307 |
| 2019/0238709 | A1* | 8/2019 | Sugihara | F24F 11/61 |
| 2020/0402230 | A1* | 12/2020 | Schmidt | G06N 20/00 |
| 2021/0201195 | A1* | 7/2021 | Vengertsev | G06N 3/04 |
| 2022/0018567 | A1* | 1/2022 | Ock | F24F 11/63 |

FOREIGN PATENT DOCUMENTS

JP     2018-069684 A    5/2018

* cited by examiner

*Primary Examiner* — Helen Zong
(74) *Attorney, Agent, or Firm* — Canon U.S.A., Inc. IP Division

(57) ABSTRACT

An image processing apparatus includes an input unit configured to input image data, a learning unit configured to perform machine learning processing using information contained in the image data input by the input unit, an estimation unit configured to output an estimation result based on the information contained in the image data using a learning model generated by learning of the learning unit, and a determination unit configured to determine whether the image data input by the input unit contains sensitive information, wherein in a case where the determination unit determines that the image data input by the input unit contains the sensitive information, the learning unit does not perform machine learning on at least the sensitive information contained in the image data.

17 Claims, 18 Drawing Sheets

FIG.6A

Table 2

| | TEMPERATURE | HUMIDITY | TRAFFIC | SALES |
|---|---|---|---|---|
| 2019/5/1 | 30 | 34 | 123 | 168 |
| 2019/5/2 | 27 | 31 | 98 | 45 |
| 2019/5/3 | 34 | 36 | 109 | 180 |
| ... | ... | ... | ... | ... |
| ... | ... | ... | ... | ... |
| 2019/5/31 | 22 | 30 | 77 | 98 |

Table 3

| NAME | AGE | ADDRESS |
|---|---|---|
| | | |
| | | |

901 1 COPY
902 PAGE 1 — Confidential, Figure 1, Table 1, (1)
PAGE 2 — SALES RESULTS, Table 2, (2) — 903
PAGE 3 — (3), (4)
PAGE 4 — Table 3 — 904
PAGE 5 — SALES RESULTS, Table 4, Table 5, Figure 3, Figure 4

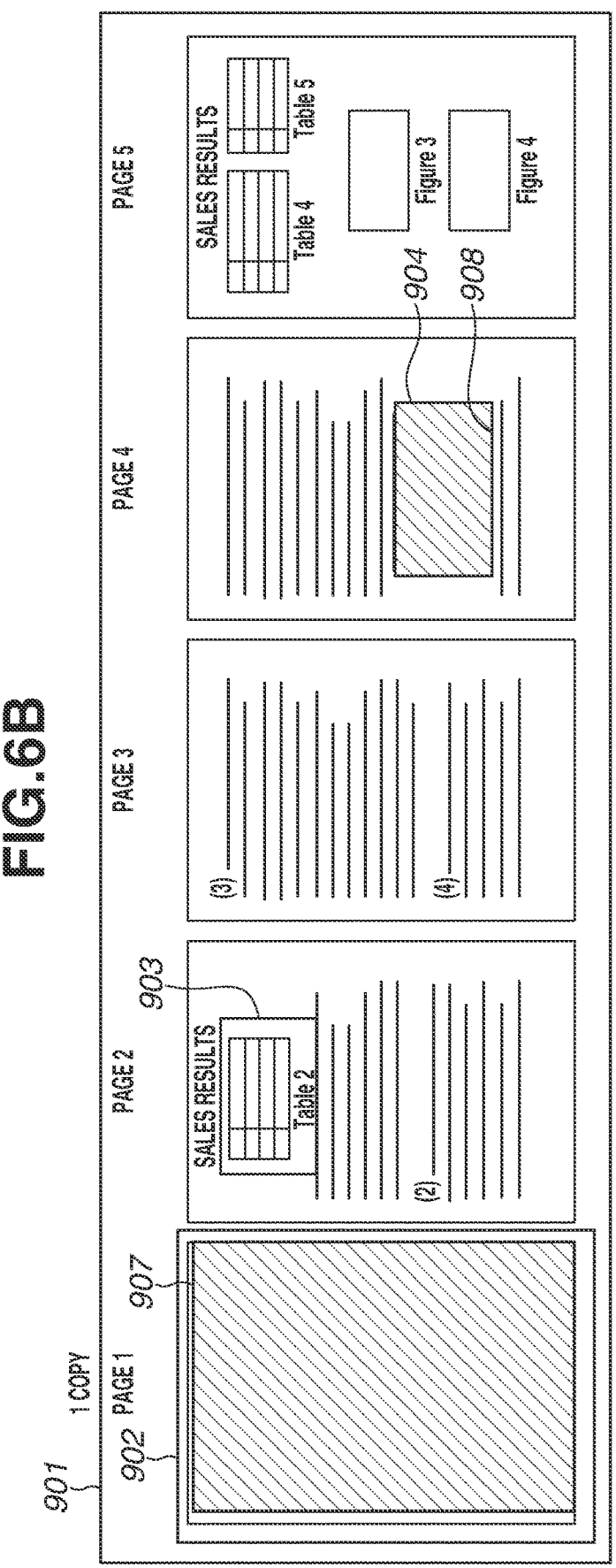

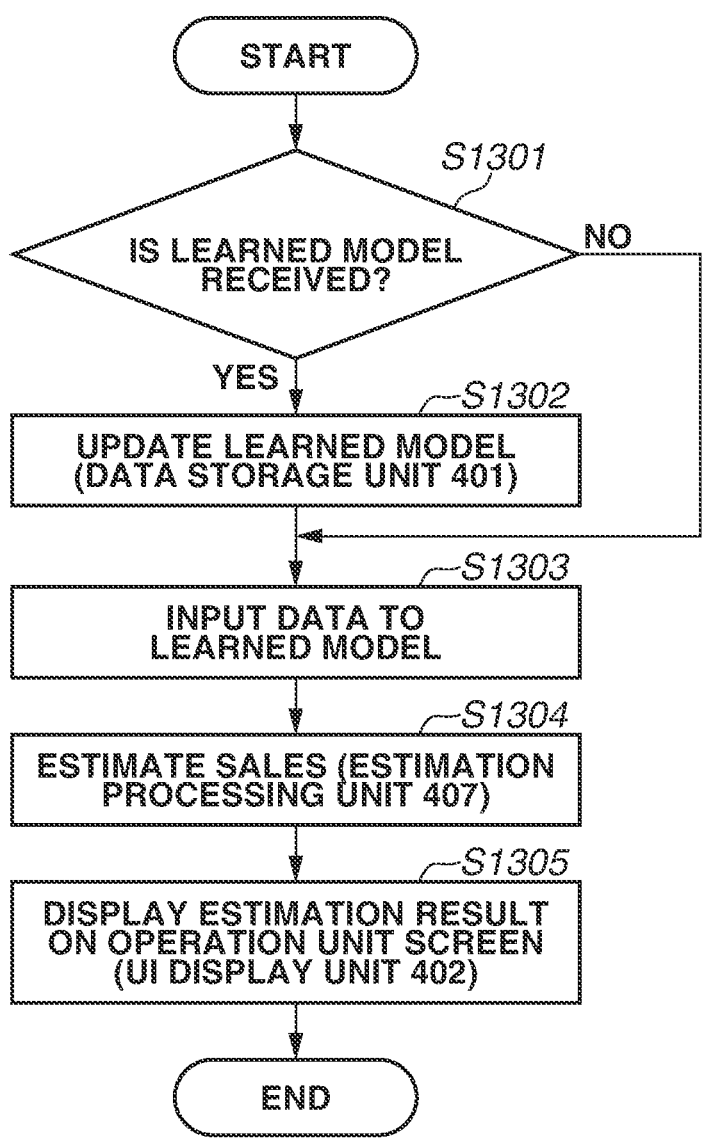

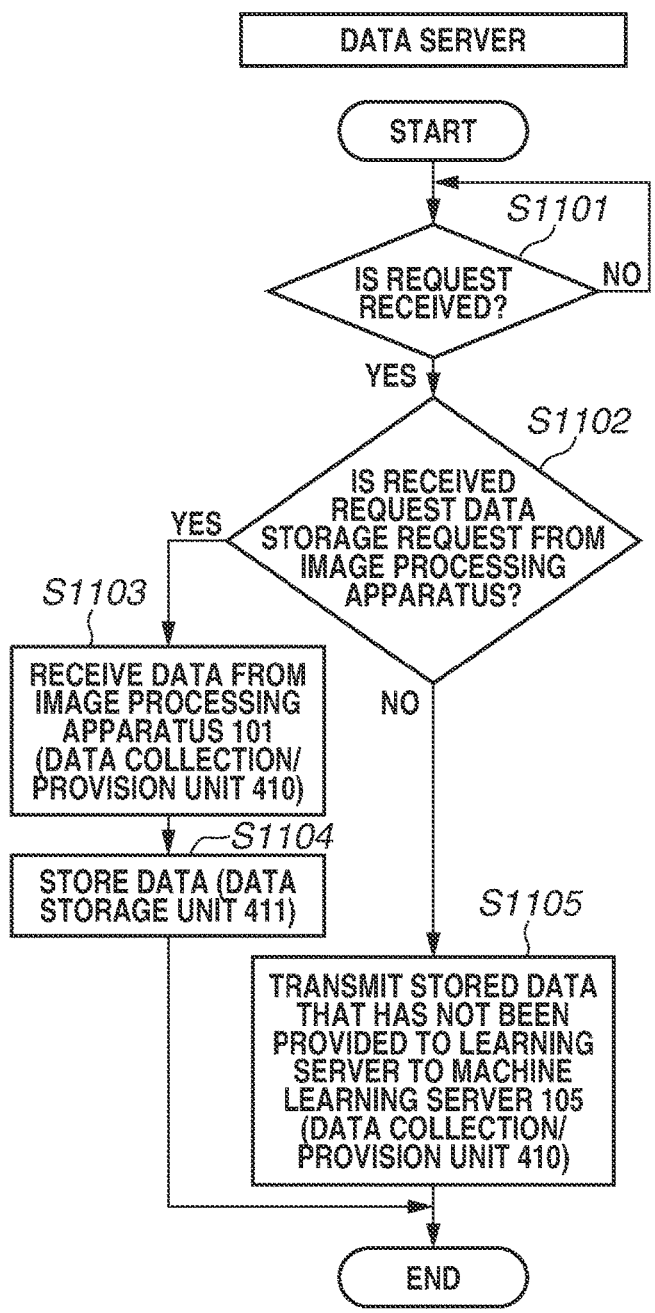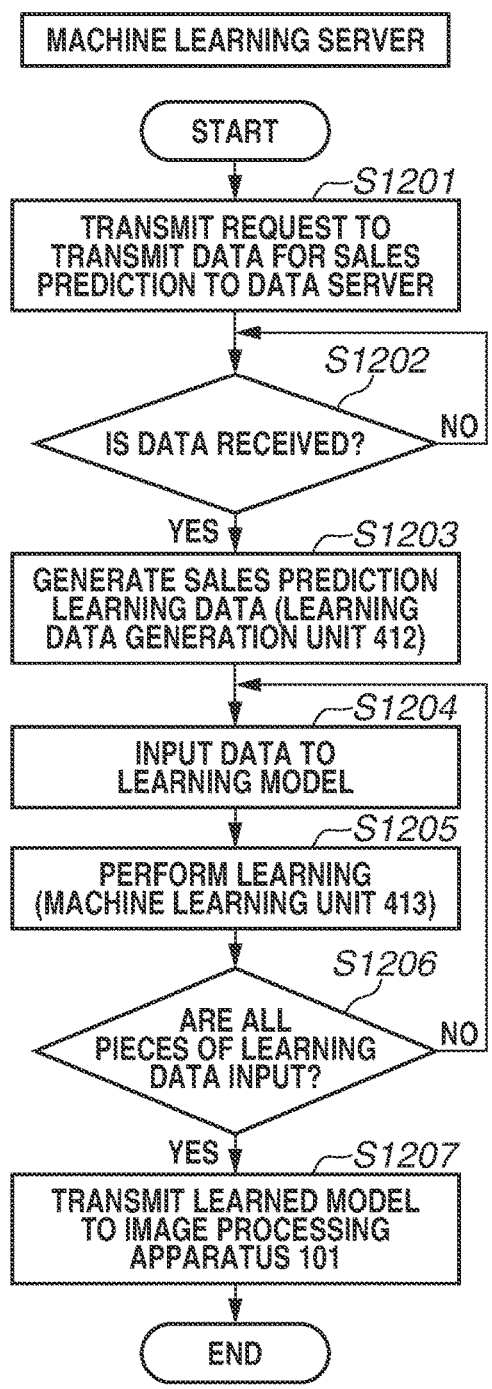

UI SCREEN IN A CASE WHERE LEARNING IS EXECUTED IN BACKGROUND DURING COPYING
NUMBER OF LEARNED PAGES WITH RESPECT TO NUMBER OF COPIED PAGES IS DISPLAYED

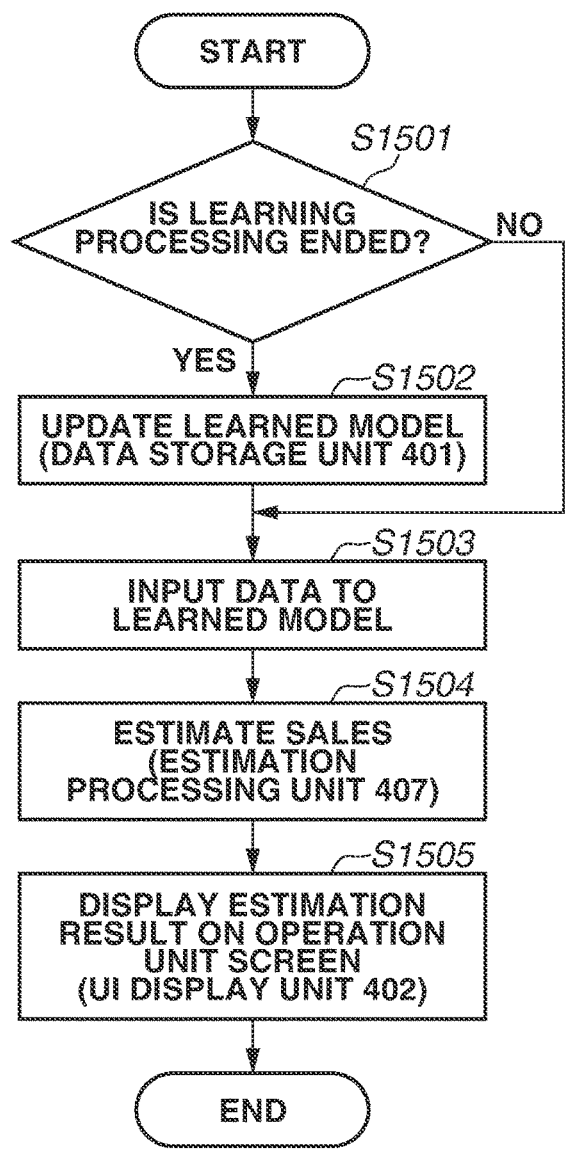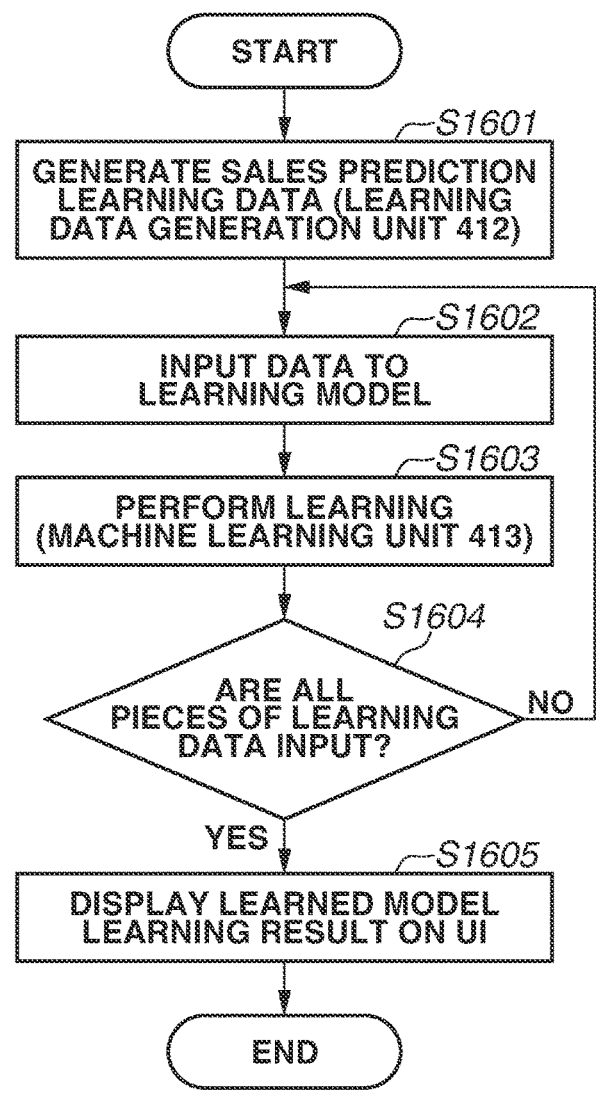

IMAGE PROCESSING APPARATUS, CONTROL METHOD THEREOF, AND STORAGE MEDIUM

BACKGROUND

Field of the Disclosure

The present disclosure relates to image processing apparatuses, control methods thereof, and storage media.

Description of the Related Art

Japanese Patent Application Laid-Open No. 2018-69684 discusses an image processing apparatus configured to learn a print setting contained in a print job received from a personal computer (PC) by machine learning to estimate a recommended print setting for a newly received print job using the learning result (model).

SUMMARY

With an image processing apparatus configured to learn information containing sensitive information included in a received job by machine learning as discussed in Japanese Patent Application Laid-Open No. 2018-69684, the following issue arises. For example, learning sensitive information contained in image data included in a received job by machine learning and then generating a model may lead to a leakage of the sensitive information stored as part of the model and may bring an unfavorable result to a user of the image processing apparatus.

In view of the above-described issue, some embodiments are directed to a technique that reduces the possibility of a leakage of sensitive information contained in input data from an image processing apparatus configured to execute machine learning based on the input data.

According to an aspect of some embodiments, an image processing apparatus includes an input unit configured to input image data, a learning unit configured to perform machine learning processing using information contained in the image data input by the input unit, an estimation unit configured to output an estimation result based on the information contained in the image data using a learning model generated by learning of the learning unit, and a determination unit configured to determine whether the image data input by the input unit contains sensitive information, wherein in a case where the determination unit determines that the image data input by the input unit contains the sensitive information, the learning unit does not perform machine learning on at least the sensitive information contained in the image data.

Further features of various embodiments will become apparent from the following description of exemplary embodiments with reference to the attached drawings.

BRIEF DESCRIPTION OF THE DRAWINGS

FIGS. 6A and 6B illustrate an example of an operation of the image processing system.

FIGS. 7A and 7B are flowcharts illustrating an example of a process of an artificial intelligence (AI) function.

FIGS. 8A and 8B are flowcharts illustrating an example of a process of the image processing system.

FIGS. 15A to 15C are flowcharts illustrating an example of a process of the AI function.

DESCRIPTION OF THE EMBODIMENTS

Various exemplary embodiments will be described in detail below with reference to the drawings. It should be noted that the exemplary embodiments disclosed herein are not intended to limit the scope of the claims and that not every combination of features described in the exemplary embodiments is always essential to a technical solution of every embodiment.

Various exemplary embodiments will be described below with reference to the drawings.

<System Configuration Diagram>

Figure 1:
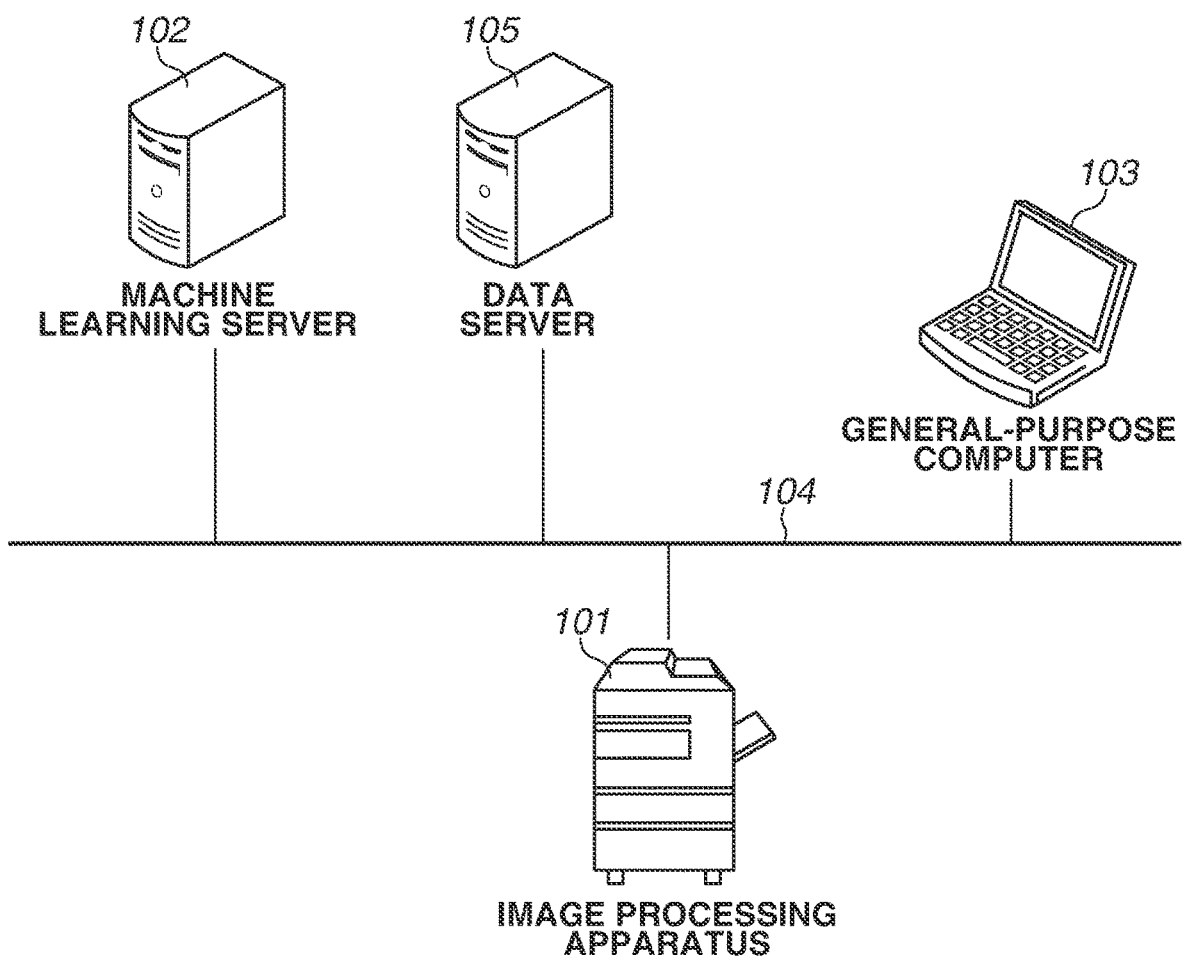
FIG. 1 illustrates an example of an image processing system.

FIG. 1 illustrates an example of an image processing system. The image processing system includes an image processing apparatus 101, such as a printer, a multi-function peripheral, or a facsimile device, a machine learning server 102, a data server 105, and a general-purpose computer 103 that transmits print data to the image processing apparatus 101. The image processing apparatus 101, the machine learning server 102, the data server 105, and the computer 103 are connected to a network 104, such as a wired local area network (wired LAN). The image processing apparatus 101 includes an artificial intelligence (AI) function. The machine learning server 102 plays the role of generating a learned model with which the image processing apparatus 101 performs the AI function. The data server 105 plays the role of collecting learning data from an external device for use in machine learning by the machine learning server 102 and of providing the collected learning data to the machine learning server 102. The image processing apparatus 101 receives the generated learned model from the machine learning server 102 as needed so that a specific AI function is enabled. Further, the machine learning server 102 receives learning data for training a learned model to perform a specific AI function from an external device, such as the data server 105, the image processing apparatus 101, or the computer 103. Then, learning processing is performed using part of the received learning data or the entire received learning data.

The system according to the present exemplary embodiment has a feature that partially or entirely stops a process of the AI function of the image processing apparatus 101 when data processed by the image processing apparatus 101 contains sensitive information. The data processed by the image processing apparatus 101 refers to data that is input to or output from the image processing apparatus 101, such as image data generated by reading a document image or print data transmitted from the computer 103.

<Image Processing Apparatus—Overall Configuration>

Figure 2:
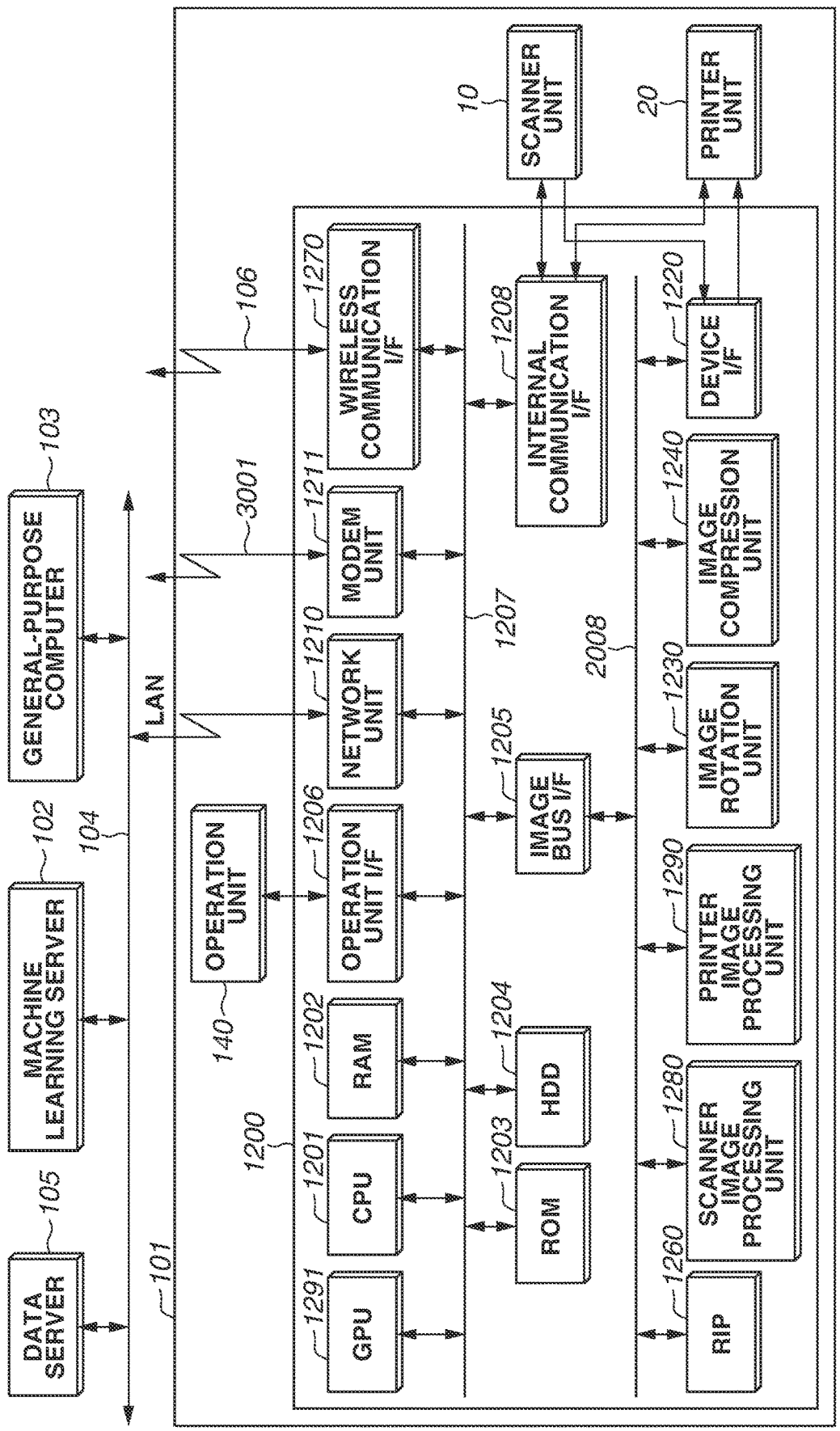
FIG. 2 illustrates an example of a hardware configuration of an image processing apparatus.

FIG. 2 illustrates an example of a hardware configuration of the image processing apparatus 101.

The image processing apparatus 101 includes an operation unit 140, a scanner unit 10, and a printer unit 20. A user performs various operations with the operation unit 140. The scanner unit 10 reads a document image based on an instruction via the operation unit 140. The printer unit 20 prints an image on a sheet based on image data. The scanner unit 10 includes a central processing unit (CPU) for controlling the scanner unit 10 and an illumination lamp and a scan mirror (not illustrated) for document reading. The printer unit 20 includes a CPU for controlling the printer unit 20, a photosensitive drum (not illustrated) for image forming, and a fixing device (not illustrated) for fixing. Further, the image processing apparatus 101 includes a controller 1200 that is connected to the scanner unit 10, the printer unit 20, the local area network (LAN) 104, a public line (WAN) 3001, and a wireless LAN 106 and that comprehensively controls operations of the image processing apparatus 101.

<Image Processing Apparatus—Controller Configuration>

FIG. 2 illustrates an example of a hardware configuration of the image processing apparatus 101. The controller 1200 includes a raster image processor (RIP) 1260 that converts page description language (PDL) codes contained in a print job received via the LAN 104 from the computer 103 connected to the LAN 104 into a bitmap image. The controller 1200 also includes a scanner image processing unit 1280 that corrects, processes, and/or edits image data input from the scanner unit 10. In addition, the controller 1200 includes a printer image processing unit 1290 and an image rotation unit 1230. The printer image processing unit 1290 performs correction and/or resolution conversion on image data output (printed) by the printer unit 20. The image rotation unit 1230 rotates image data.

Further, the controller 1200 includes an image compression unit 1240. The image compression unit 1240 performs Joint Photographic Experts Group (JPEG) compression/decompression processing on multi-valued image data or Joint Bi-level Image Experts Group (JBIG), Modified Modified Relative Element Address Designate (MMR), or Modified Huffman (MH) compression/decompression processing on binary image data. In addition, the controller 1200 includes a device interface (device I/F) 1220. The device I/F 1220 connects the scanner unit 10 and the printer unit 20 to the controller 1200 and performs synchronous/asynchronous conversion on image data. The controller 1200 also includes an image bus 2008. The image bus 2008 connects the RIP 1260, the scanner image processing unit 1280, the printer image processing unit 1290, the image rotation unit 1230, the image compression unit 1240, and the device I/F 1220 to one another and transfers image data at high speed.

Further, the controller 1200 includes a CPU 1201 as a control unit that controls the image processing apparatus 101. In addition, the controller 1200 includes a random access memory (RAM) 1202. The RAM 1202 is a system work memory for operations of the CPU 1201 and is also an image memory for temporarily storing image data. The controller 1200 outputs image data to be displayed on the operation unit 140 to the operation unit 140 via an operation unit interface (operation unit I/F) 1206, which is an interface between the controller 1200 and the operation unit 140.

The operation unit I/F 1206 transmits information input by a user of the image processing apparatus 101 from the operation unit 140 to the CPU 1201. Further, the controller 1200 includes a network unit 1210 that is connected to the LAN 104 and that communicates (transmission/reception) with the computer 103 and other computer terminals (not illustrated) on the LAN 104. In addition, the controller 1200 includes a modem unit 1211 that is connected to the public line 3001 and that communicates (transmit/receive) data with an external facsimile apparatus (not illustrated). The controller 1200 also includes a wireless communication interface (wireless communication I/F) 1270 that connects to an external terminal via the wireless LAN 106. The controller 1200 further includes a read-only memory (ROM) 1203 and a hard disk drive (HDD) 1204. The ROM 1203 stores a boot program to be executed by the CPU 1201. The HDD 1204 stores system software, image data, and software counter values. Further, the controller 1200 includes an internal communication interface (internal communication I/F) 1208 and a system bus 1207. The internal communication I/F 1208 communicates with the scanner unit 10 and the printer unit 20. The system bus 1207 connects the CPU 1201, the RAM 1202, the operation unit I/F 1206, the network unit 1210, the modem unit 1211, the wireless communication I/F 1270, the ROM 1203, the HDD 1204, and the internal communication I/F 1208 to one another.

The controller 1200 includes an image bus interface (image bus I/F) 1205. The image bus I/F 1205 is a bus bridge that connects the system bus 1207 and the image bus 2008 together to convert a data configuration.

The CPU 1201 records a job execution history, such as output attribute information including a username, the number of copies to be printed, and color printing, in print/copy job execution as job log information on the HDD 1204 or the RAM 1202.

A graphics processing unit (GPU) 1291 can perform efficient calculation by parallel processing on a large amount of data. Therefore it is effective to perform processing using the GPU 1291 in a case where learning is to be performed a plurality of times using a learning model for machine learning, such as deep learning. In the present exemplary embodiment, a case will be described where a machine learning unit 413 performs processing using the GPU 1291 in addition to the CPU 1201. Specifically, in a case where a learning program including a learning model is executed, the CPU 1201 and the GPU 1291 cooperatively perform calculation to thereby perform learning. Alternatively, the CPU 1201 or the GPU 1291 alone may perform calculation in the processing by the machine learning unit 413. Further, an estimation processing unit 406 can use the GPU 1291 similarly to the machine learning unit 413.

<Machine Learning Server>

Figure 3:
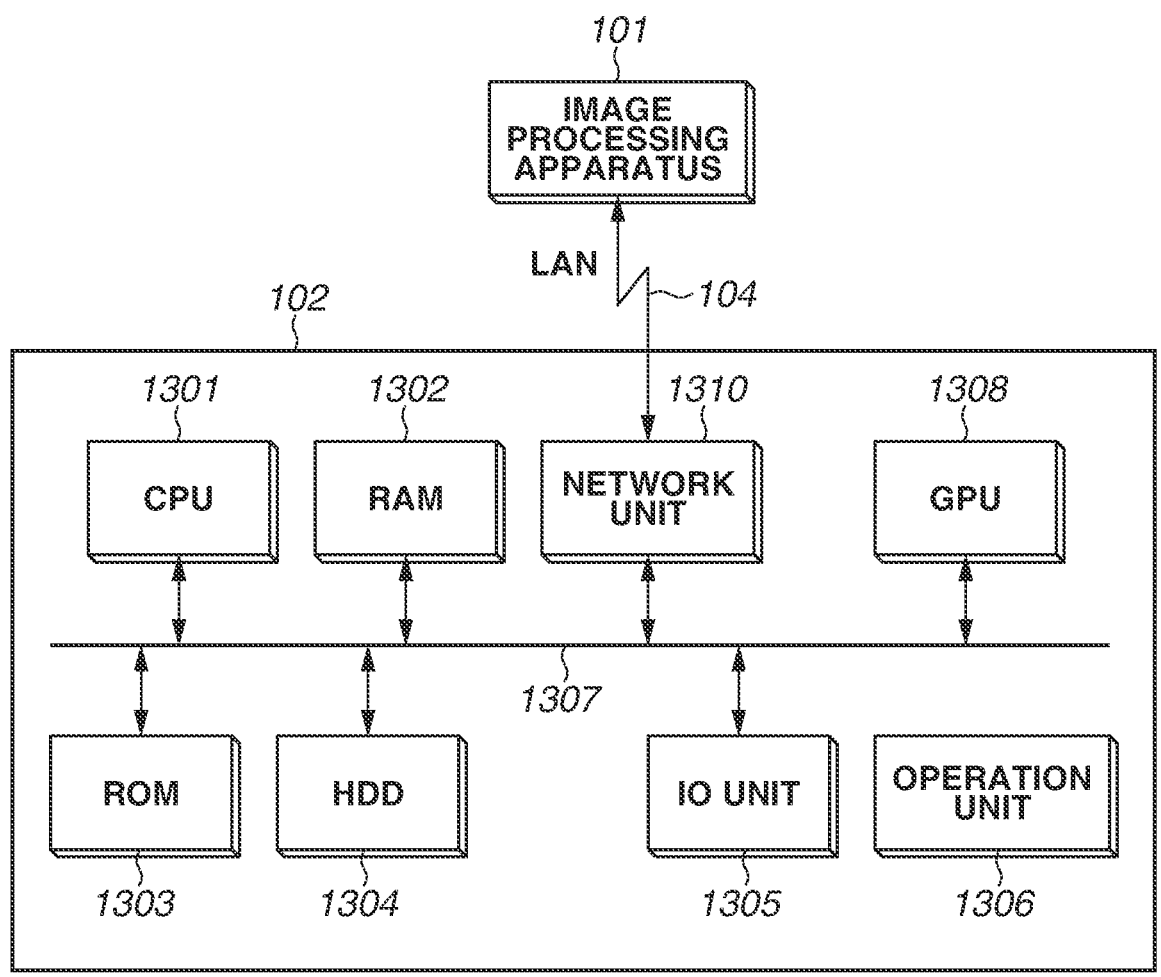
FIG. 3 illustrates an example of a hardware configuration of a machine learning server.

FIG. 3 illustrates an example of a hardware configuration of the machine learning server 102.

The machine learning server 102 includes a CPU 1301, a RAM 1302, a ROM 1303, a HDD 1304, a network unit 1310, an input/output unit 1305, and an operation unit 1306. The CPU 1301, the RAM 1302, the ROM 1303, the HDD 1304, the network unit 1310, and the input/output unit 1305 are connected together via a system bus 1307.

The CPU 1301 provides various functions by reading a program, such as an operating system (OS) or application software, from the HDD 1304 and executing the read program. The RAM 1302 is a system work memory when the CPU 1301 executes a program. The ROM 1303 stores a program for starting a basic input output system (BIOS), a program for launching the OS, and a setting file. The HDD 1304 is a hard disk drive and stores system software. The network unit 1310 is connected to the LAN 104 and communicates (transmission/reception) with an external device, such as the image processing apparatus 101. The IO unit 1305 is an interface for inputting and outputting information to and from the operation unit 1306 including a liquid crystal display input/output device provided with a multi-touch sensor. Predetermined information is depicted on the liquid crystal display using a predetermined resolution and the predetermined number of colors based on screen information specified by a program. For example, a graphical user interface (GUI) screen is formed, and various windows and data for operations are displayed.

A GPU 1308 performs efficient calculation by parallel processing on a large amount of data. For the reason, it is effective to perform processing using the GPU 1308 in a case where learning is performed using a learning model, such as deep learning. Therefore in the present exemplary embodiment, the machine learning unit 413 performs processing using the GPU 1308 in addition to the CPU 1301. Specifically, in a case where a learning program including a learning model is executed, the CPU 1301 and the GPU 1308 cooperatively perform calculation to thereby perform learning. Alternatively, the CPU 1301 or the GPU 1308 alone can perform calculation in the processing by the machine learning unit 413. Further, the estimation processing unit 406 may use the GPU 1308 similarly to the machine learning unit 413.

GPU calculation resources are effectively used based on loads, such as the network communication load and the GPU processing load, and modes, such as a power-saving mode of the image processing apparatus 101.

<Software Configuration of System According to Present Exemplary Embodiment>

Figure 4:
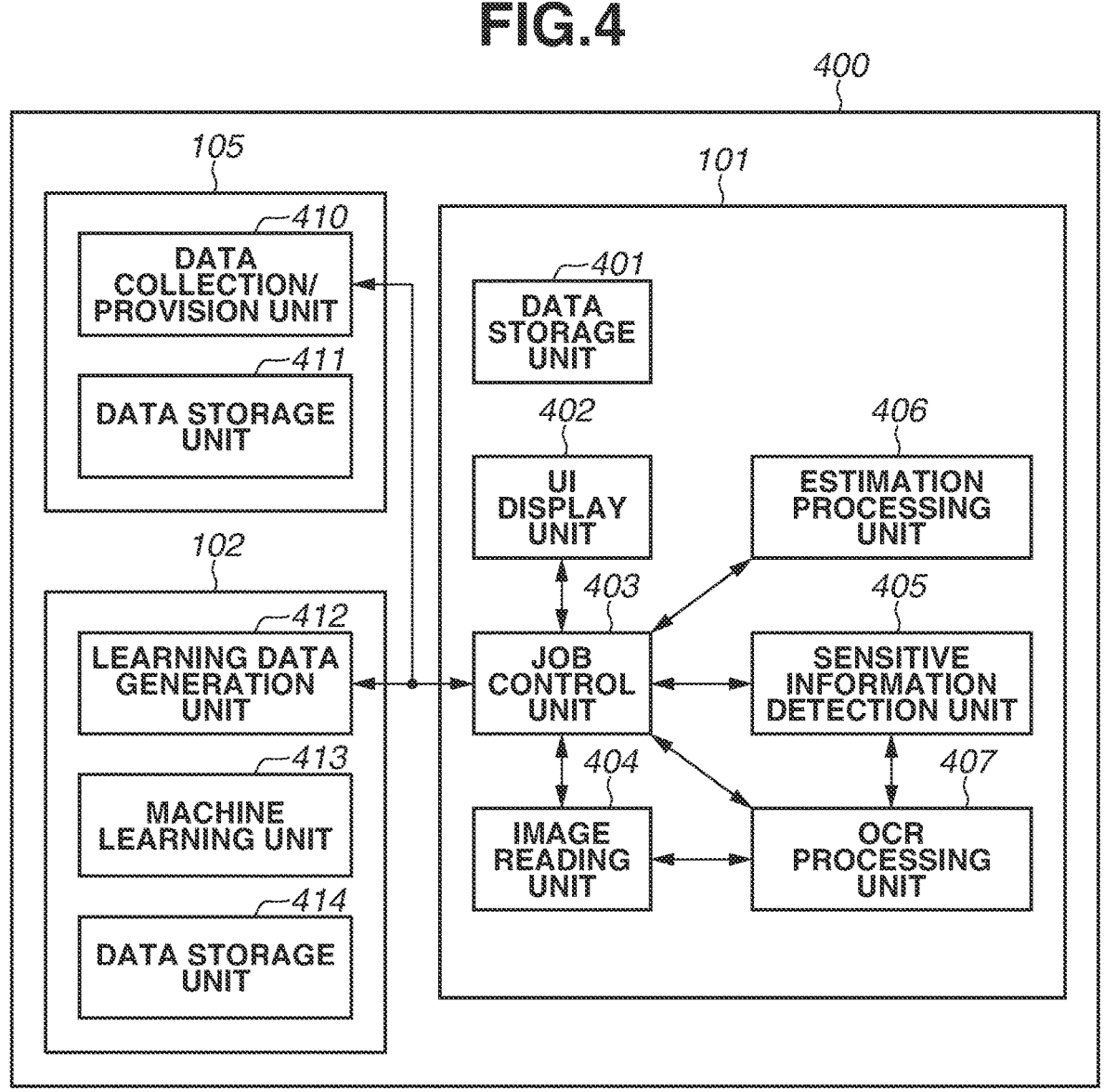
FIG. 4 illustrates an example of a software configuration of the image processing system.

FIG. 4 illustrates an example of a software configuration of the image processing system. A program for the illustrated software configuration is stored for each component on a storage. For example, the CPU 1201 reads the program from the ROM 1203 or the HDD 1204 onto the RAM 1202 and executes the program. A similar manner applies to the machine learning server 102 and the data server 105.

The illustrated software configuration makes it possible to perform a function of determining whether data input or output by the image processing apparatus 101 in the system according to the present exemplary embodiment contains sensitive information and then of performing learning processing and estimation (inference) processing. FIG. 4 illustrates functional roles of the components. The processing will be described below with reference to flowcharts illustrated in FIG. 5 and subsequent drawings.

Software of the image processing apparatus 101 includes a data storage unit 401, a user interface (UI) display unit 402, a job control unit 403, an image reading unit 404, an optical character recognition (OCR) processing unit 407, a sensitive information detection unit 405, and the estimation processing unit 406. Software of the machine learning server 102 includes a learning data generation unit 412, the machine learning unit 413, and a data storage unit 414. The data server 105 includes a data collection/provision unit 410 and a data storage unit 411.

The data storage unit 401 has a functional role of recording data input or output by the image processing apparatus 101, such as image data, learning data, and a learning model, on the RAM 1202 and the HDD 1204 in the hardware configuration in FIG. 2.

The job control unit 403 has a centrally functional role of executing a basic function of the image processing apparatus 101, such as a copy, facsimile, or print function, based on a user instruction and of performing transmission and reception of instructions and data between the other software components during an execution of the basic function.

The UI display unit 402 provides an operation reception screen to the screen of the operation unit 140 via the operation unit I/F 1206 in FIG. 2. An operation setting from a user is received via the operation reception screen. Further, the UI display unit 402 has a functional role of displaying a notification screen for notifying a user of a message, such as an estimation result by the estimation processing unit 406, in the system according to the present exemplary embodiment.

The image reading unit 404 has a role of causing the scanner unit 10 in FIG. 2 to scan in the control of execution of a copy or scan function based on an instruction from the job control unit 403. Further, the image reading unit 404 has a functional role of causing read image data to be processed by the OCR processing unit 407.

The OCR processing unit 407 is executed by the CPU 1201 illustrated in FIG. 2 and performs OCR processing on image data generated by the image reading unit 404. OCR processing is a known technique for extracting character information from image data. Specifically, the OCR processing unit 407 outputs character information (character code) about a character string converted into a predetermined format by a process of isolating character strings and characters from image data having undergone layout analysis and then by processes of character recognition, such as normalization, feature extraction, and pattern matching. Further, the OCR processing unit 407 transmits information converted to a character string based on an instruction from the job control unit 403 to the sensitive information detection unit 405. The OCR processing in the system in the present exemplary embodiment is configured so that a user can designate a region as an OCR processing target, such as a specific region on image data that the user desires to be recognized as sensitive information.

The sensitive information detection unit 405 has a functional role of determining whether a character string specified by character information acquired by the OCR processing unit 407 contains sensitive information and of subsequently transmitting the determination result to the job control unit 403.

Information to be determined as sensitive information, for example, information preset to match a use form of a user, is stored in advance in the data storage unit 401. Specifically, a character string input by a user via a keyboard is stored on the HDD 1204. For example, an input character string, such as "confidential", "classified", "top secret", "secret", or "in-company use only", is received via the operation unit 140, and information indicating that the document contains sensitive information may be stored on the HDD 1204. Alternatively, in order to determine whether personal information, which is one piece of the sensitive information, is contained, character strings, such as "address", "name", "telephone number", "email address", "account number", "ID", and "password", may be stored to be used in determining whether sensitive information is contained.

The sensitive information detection unit 405 in the system according to the present exemplary embodiment may have a software function of determining whether sensitive information is contained by collating it with a feature of not a character but an image among the data handled by the image processing apparatus 101. To determine whether not a character but an image is contained in sensitive information detection, the image used in the determination may be registered by the HDD 1204 storing the image data scanned and generated by the image processing apparatus 101.

Further, the image used in the determination may be registered by the HDD 1204 storing the image data received externally via a network.

The estimation processing unit 406 is executed by the CPU 1201 and/or the GPU 1291 illustrated in FIG. 2 and has a functional role of performing estimation processing and classification processing to perform the AI function on data input or output by the image processing apparatus 101. The estimation processing unit 406 performs processing based on an instruction from the job control unit 403, and a resultant output from the estimation processing unit 406 is transmitted to the job control unit 403.

The data server 105 includes the data collection/provision unit 410 and the data storage unit 411.

The data collection/provision unit 410 has a functional role of collecting and providing learning data to be learned by the machine learning unit 413 of the machine learning server 102. Data may be collected from an image processing apparatus other than the image processing apparatus 101 or another data server. Necessary data for intended machine learning can be collected. The data storage unit 411 has a functional role of recording and managing collected learning data.

Software of the machine learning server 102 includes the learning data generation unit 412, the machine learning unit 413, and the data storage unit 414.

The learning data generation unit 412 has a functional role of optimizing learning data by processing data received from the data server 105 into a form in which an effective learning result is obtained, through removing unnecessary data that will become noise in order to produce an intended learning effect. The learning data generation unit 412 is executed by the CPU 1301 illustrated in FIG. 3.

The data storage unit 414 temporarily stores data received from the data server 105, generated learning data, and a model trained by the machine learning unit 413 on the RAM 1302 or the HDD 1304 illustrated in FIG. 3.

The machine learning unit 413 performs machine learning using the GPU 1308 and/or the CPU 1301 illustrated in FIG. 2 using learning data generated by the learning data generation unit 412 as input. A specific process of machine learning will be described below.

<Conceptual Diagram of Learning Model>

Figure 5A:
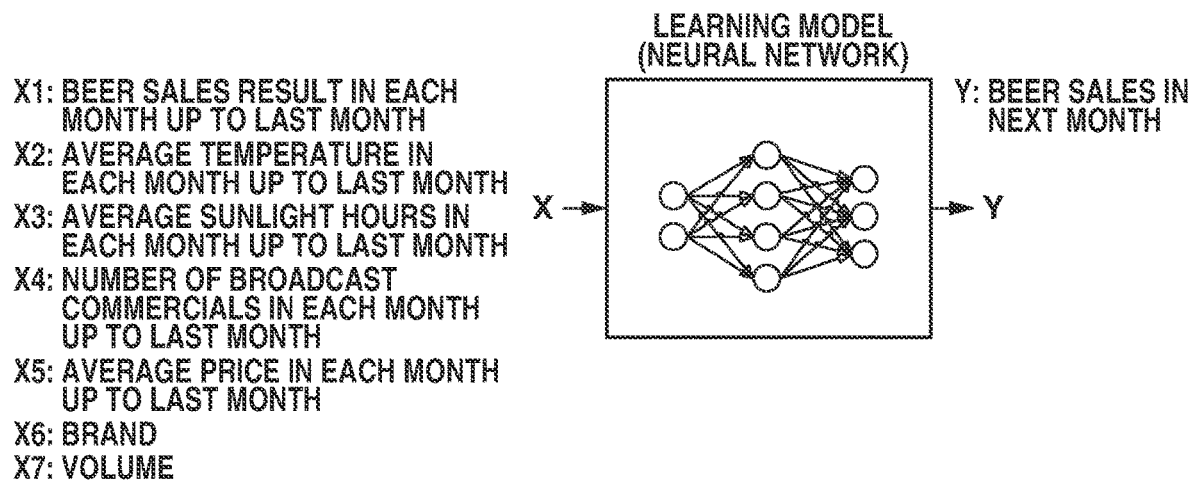
FIGS. 5A and 5B illustrate an example of machine learning processing.
Figure 5B:
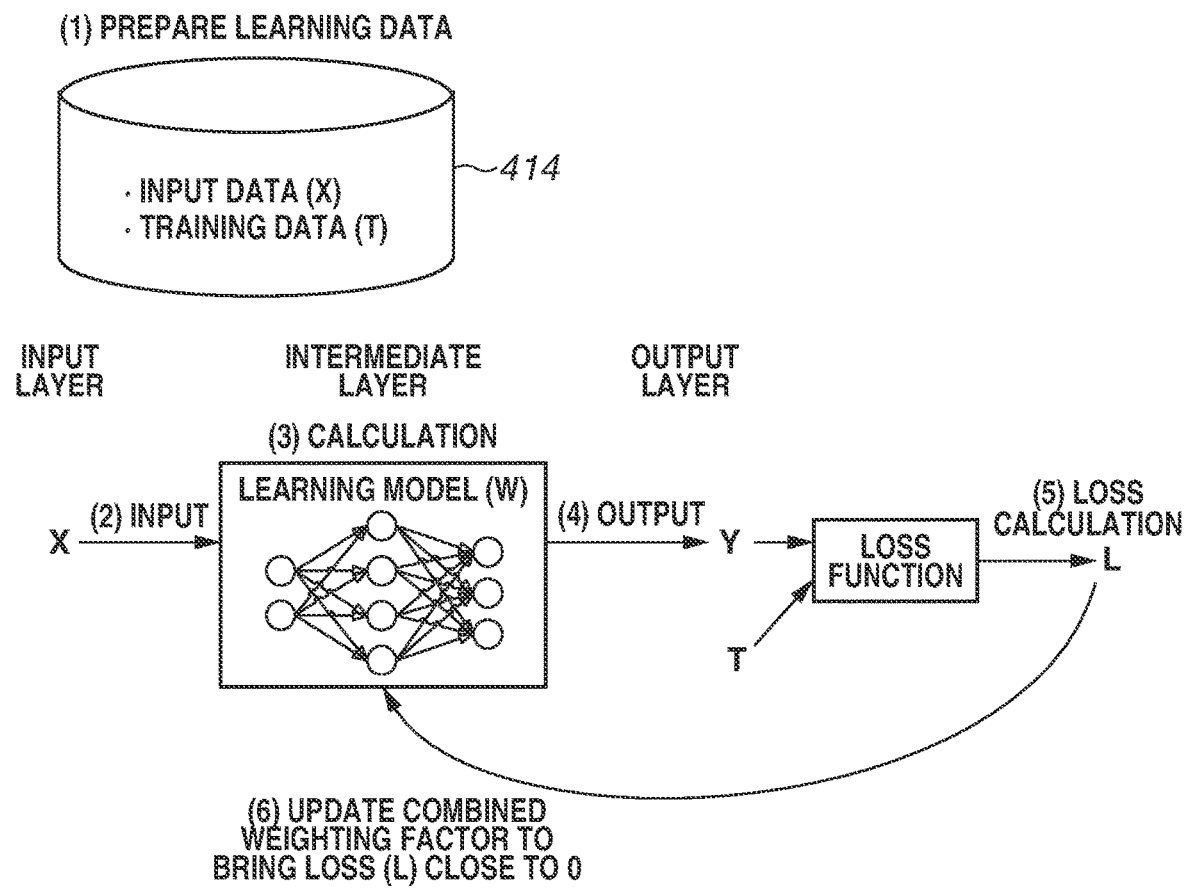

FIGS. 5A and 5B illustrate an example of machine learning processing. A learning model using a neural network among machine learning methods is illustrated as an example. Learning data X for generating a learning model for beer sales prediction by the neural network is illustrated as pieces of learning data X1 to X7 as an example illustrating a feature of the system according to the present exemplary embodiment.

Specific machine learning algorithms include a nearest neighbor algorithm, Naive Bayes, decision tree, and support vector machine. Another machine learning algorithm is deep learning in which feature values for learning and combined weighting factors are self-generated using a neural network. Any of the above-described algorithms can be used and applied as appropriate to the present exemplary embodiment.

The machine learning unit 413 may include an error detection unit and an updating unit. The error detection unit acquires an error between training data T and output data Y output from an output layer of the neural network based on input data X input to an input layer. Then, a loss (L) indicating the error between the output data Y from the neural network and the training data T may be calculated using a loss function.

The updating unit updates combined weighting factors between nodes of the neural network based on the loss (L) calculated by the error detection unit so that the loss (L) is reduced. The updating unit updates combined weighting factors using, for example, backpropagation. Backpropagation is a method of adjusting combined weighting factors between nodes of a neural network to reduce the error.

A great number of pieces of learning data of a set of "input data with a known correct value" and "a correct value" are prepared, and weighting factors in a learning model (W) are adjusted to bring an output as close as possible to the correct value in a case where input data corresponding to the correct value is input. The process provides a highly-accurate learning model (W).

The above process is referred to as learning, and a learning model adjusted through learning is referred to as a learned model.

Training data (set of "input data with a known correct value" and "correct value") prepared will be described below.

<Operations of System According to Present Exemplary Embodiment>

FIGS. 6A and 6B illustrate an example of operations of the image processing system. In a five-page document 901, a document 902 on page 1 contains a character string "confidential". Table 2 on page 2 contains sales results data 903. Table 3 on page 4 contains personal information 904 including "name", "age", and "address".

In the system according to the present exemplary embodiment based on the software configuration illustrated in FIG. 4, the scanner unit 10 reads data contained in a part of a document read by the image processing apparatus 101, and OCR processing is performed to convert the read data into electronic data. The data server 105 collects the electronic data, and the machine learning server 102 generates learning data and performs learning.

In the system according to the present exemplary embodiment, the sensitive information detection unit 405 detects the word "confidential" as sensitive information.

In the above case, the job control unit 403 can control the data server 105 not to collect the entire data on the five-page document 901 or partial data on the document 902 of page 1 if the job control unit 403 receives a notification of sensitive information detection. Further, the job control unit 403 can control the machine learning server 102 not to generate learning data and not to perform machine learning.

Figure 7A:
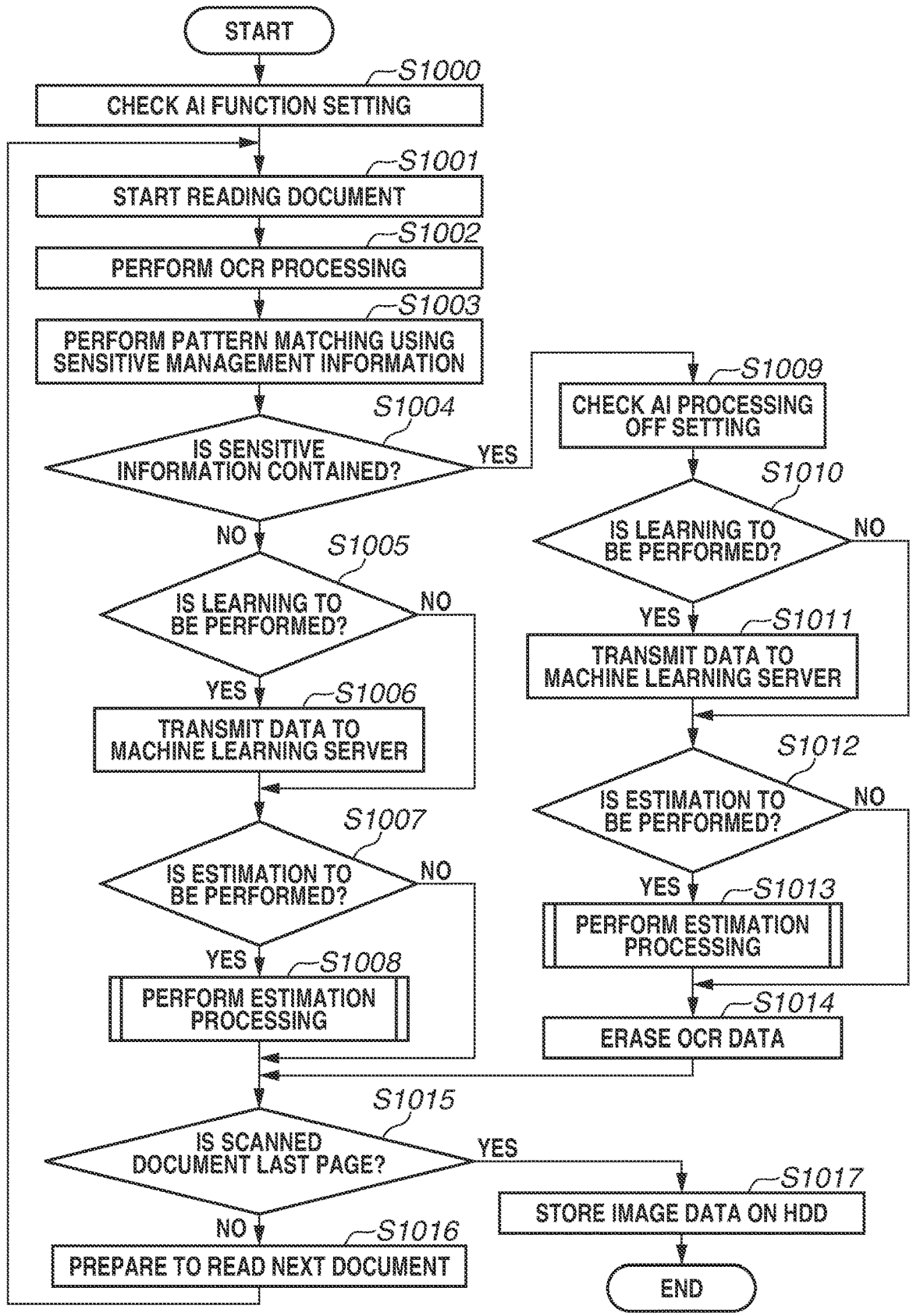

In a case where it is determined that sensitive information is contained in S1004 in a flowchart illustrated in FIG. 7A (YES in S1004), regions (the regions 907 and 908) on which machine learning is not to be performed may be masked in learning processing and estimation processing.

A notification of results and details of machine learning performed under the above-described control is to be provided to a user via an operation unit screen on the UI display unit 402 so that the user can recognize the process.

As to word information to be detected as sensitive information, the UI display unit 402 can receive a word setting that matches a user intention.

The operations illustrated in FIGS. 6A and 6B are performed as described above so that the process is partially or entirely stopped when information is detected as sensitive information. Thus, the process offers an advantage of reducing the risk of sensitive information leakage through a process of machine learning.

<Operation Process of System According to Present Exemplary Embodiment>

FIGS. 7A and 7B are flowcharts illustrating an example of a process of the AI function. FIG. 7A is a flowchart illustrating an example of a process in an execution of the AI function. The CPU 1201 reads a program stored on the ROM 1203 onto the RAM 1202 and executes the read program to thereby execute the process illustrated in the flowchart in FIG. 7A. The process in FIG. 7A is started if a "scan and AI prediction" button on a home screen displayed on a touch panel 11 illustrated in FIG. 9A described below is selected.

First, in S1000, the CPU 1201 acquires the AI function settings set, such as individual execution settings of the learning processing and the estimation processing of the AI processing, a selected model for each purpose of learning, and sensitive information setting, via the screens illustrated in FIGS. 9A to 11B.

Figure 9A:
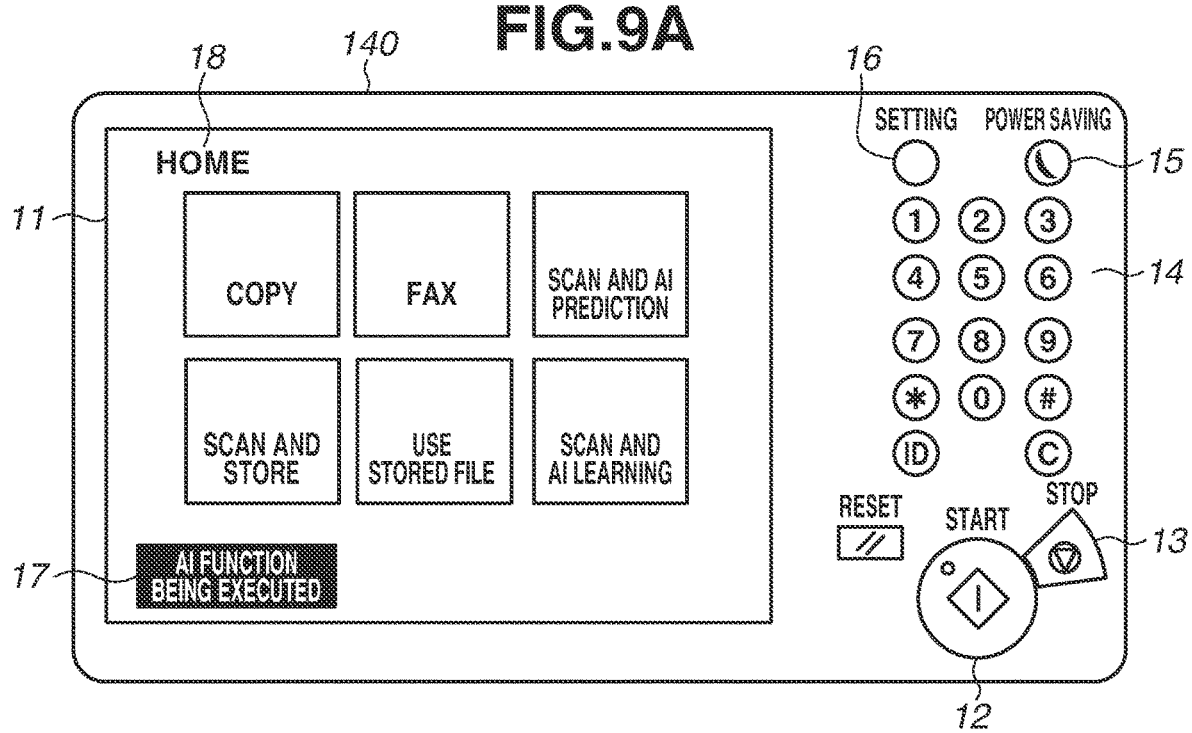
FIGS. 9A and 9B illustrate an example of an operation unit of the image processing apparatus.
Figure 9B:
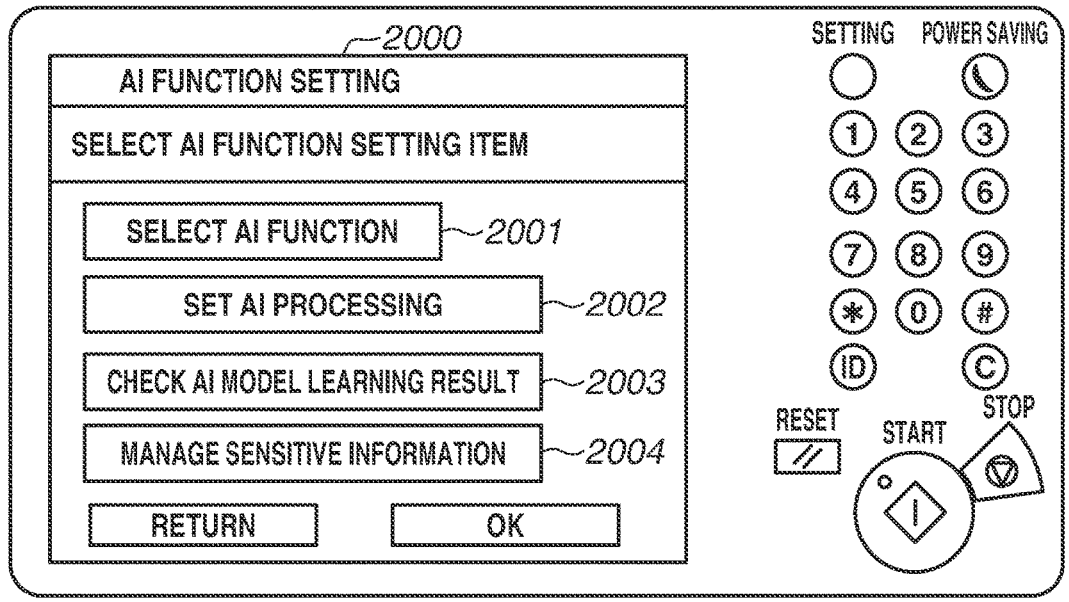

FIGS. 9A and 9B illustrate an example of the operation unit 140 of the image processing apparatus 101. The touch panel 11 combines a touch panel and liquid crystal to display an operation screen and to transmit information to the controller 1200 if a displayed key for the information is pressed by a user. A start key 12 is used to start reading/printing a document image and also to input an instruction to start another function. The start key 12 includes a green light-emitting diode (green LED) and a red light-emitting diode (red LED). Green illumination indicates a state of being ready to start, whereas red illumination indicates a state of not being ready to start. A stop key 13 serves to stop an operation being executed. A hardware key group 14 includes a numeric keypad, a clear key, a reset key, and a set key. A power saving key 15 is used to change the image processing apparatus 101 via the operation unit 140 to a sleep mode or to resume an operation of the image processing apparatus 101. The image processing apparatus 101 in a normal mode is changed to the sleep mode at the press of the power saving key 15 by a user, and the image processing apparatus 101 in the sleep mode is changed to the normal mode at the press of the power saving key 15 by a user. A setting key 16 is used to set an AI function setting. Further, the operation unit 140 transmits information for generating job information to the operation unit I/F 1206, such as a username, the number of copies to be printed that are input by a user via the touch panel 11, and output attribute information.

The functions "copy", "fax", "scan and AI prediction", "scan and store", "use stored file", and "scan and AI learning" of the image processing apparatus 101 are selectable on a home screen 18. An AI function icon 17 that displays an AI function status is displayed so that a user can recognize the operation status of the AI function. The AI function icon 17 is displayed only when the AI function is being executed, and not when the AI function is not being executed. Alternatively, instead of not being displayed, the AI function icon 17 may be displayed by a different method, such as a manner in which the AI function icon 17 is grayed out, with the AI function not being executed. Further, selecting the AI function icon 17 causes an AI function setting selection screen 2000 illustrated in FIG. 9B to be displayed.

Figure 10A:
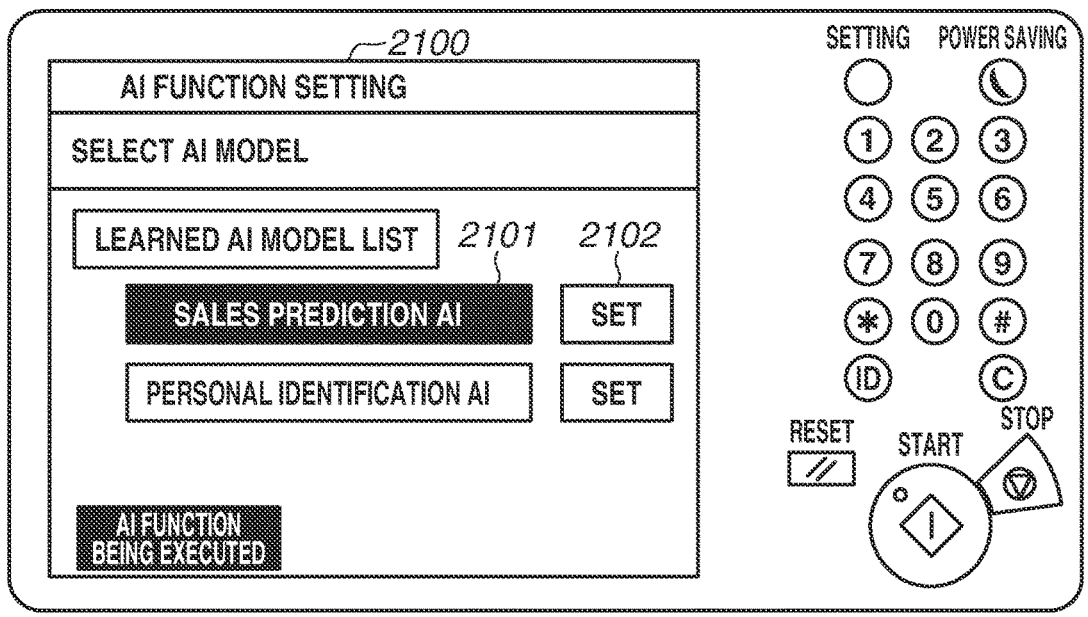
FIGS. 10A and 10B illustrate an example of AI processing setting screens.
Figure 10B:
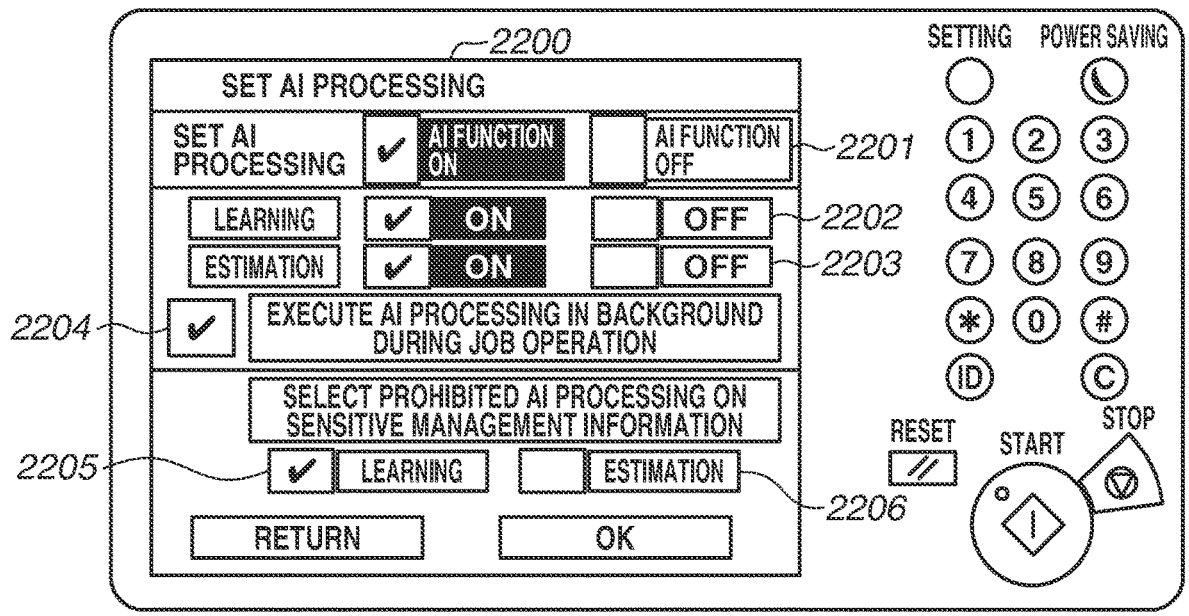

FIG. 9B illustrates an example of the AI function setting selection screen 2000. If an AI function selection button 2001 is selected, an AI function setting screen 2100 in FIG. 10A is displayed. If an AI processing detailed setting button 2002 is selected, an AI processing setting screen 2200 in FIG. 10B is displayed. If an AI model learning result check button 2003 is selected, an AI model learning result screen 2600 in FIG. 12B is displayed. If a sensitive information management button 2004 is selected, a sensitive information management screen 2300 in FIG. 11A is displayed.

FIGS. 10A and 10B illustrate an example of AI processing setting screens. The screens in FIGS. 10A and 10B are displayed on the touch panel 11 of the operation unit 140. FIG. 10A illustrates an example of the AI function setting screen 2100. The AI function setting screen 2100 displays "sales prediction AI" and "personal identification AI" as a list of learned AI models. In the present exemplary embodiment, the sales prediction AI will be described below as an example. If a sales prediction AI 2101 is selected, a model to be used in the AI function is set as the sales prediction AI. Selecting a setting button 2102 causes the AI processing setting screen 2200 in FIG. 10B to be displayed and then, which enables detailed settings of the corresponding model to be specified.

FIG. 10B illustrates an example of a screen for detailed AI processing settings. Detailed AI processing settings can be set via the AI processing setting screen 2200. For example, an AI function ON/OFF setting 2201 is selectable by checking a checkbox. A learning section 2202 and an estimation section 2203 are provided as separate selection items so that the learning and the estimation are independently settable to "ON" or "OFF". A checkbox 2204 is displayed with which a user selects whether to execute AI processing in the background during a job operation of a basic function of the image processing apparatus 101, such as the copy or fax function. Checkboxes 2205 and 2206 are displayed with which a user sets whether to prohibit AI processing on sensitive information in the learning processing and in the estimation processing, respectively. One or both of the checkboxes 2205 and 2206 can be checked.

Figure 11A:
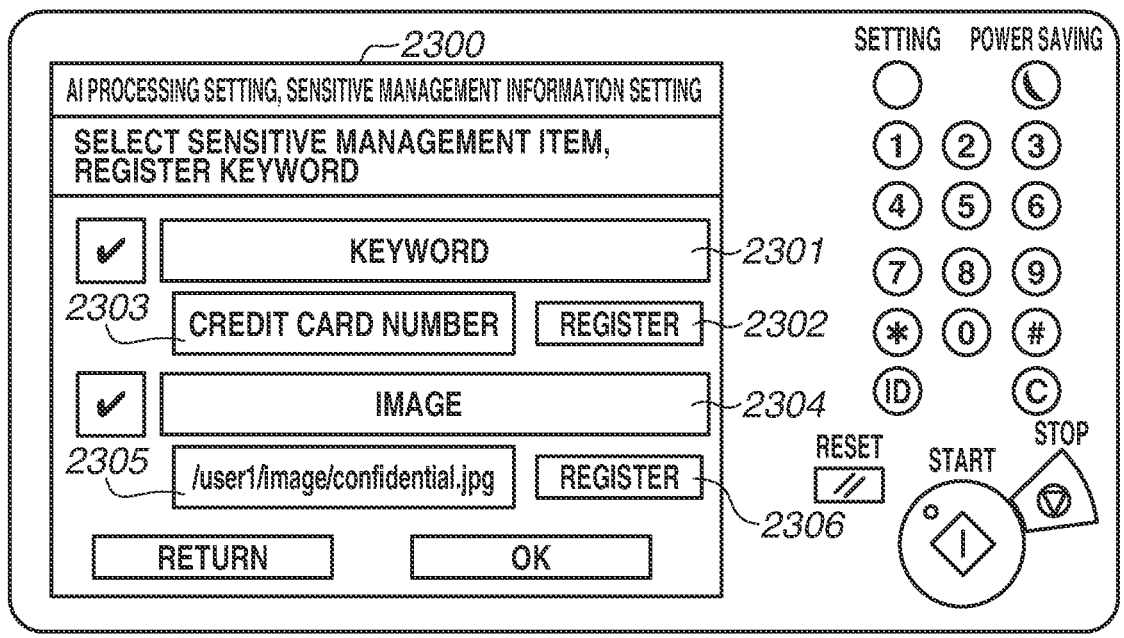
FIGS. 11A and 11B illustrate an example of sensitive information management screens.
Figure 11B:
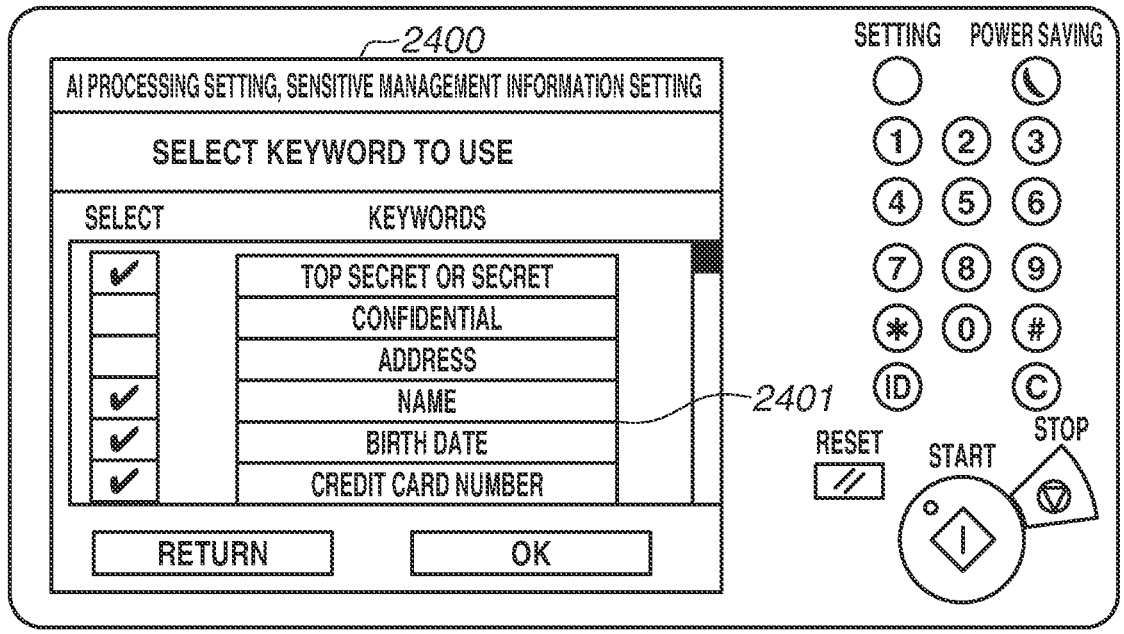

FIGS. 11A and 11B illustrate an example of sensitive information management screens. The screens in FIGS. 11A and 11B are displayed on the touch panel 11 of the operation unit 140. FIG. 11A illustrates an example of the sensitive information management screen 2300. The sensitive information management screen 2300 displays a keyword setting button 2301, a registration button 2302, an input section 2303, an image setting button 2304, an input section 2305, and a registration button 2306.

If the keyword setting button 2301 is selected, a registered keyword screen 2400 in FIG. 11B is displayed. If the input section 2303 is selected, a software keyboard (not illustrated) is displayed to receive a user-input character string. If the registration button 2302 is selected, the character string input to the input section 2303 is registered as a keyword and stored on the HDD 1204. In FIG. 11A, the character string "credit card number" is input in the input section 2303.

Selecting the keyword setting button 2301 causes a registered image screen (not illustrated) to be displayed. The registered image screen is similar to the registered keyword screen 2400 and displays listed registered images. Selecting the input section 2305 causes a software keyboard (not illustrated) to be displayed to receive a user-input character string (file path). Selecting the registration button 2306 causes an image stored in the path input in the input section 2305 to be registered and stored on the HDD 1204.

FIG. 11B illustrates an example of a registered keyword screen. Each keyword registered in FIG. 11A is displayed as in a list 2401 on the registered keyword screen 2400, and with a checkbox next to a displayed keyword checked, the keyword will be used as sensitive information. Details thereof will be described below with reference to the flowcharts in FIGS. 7A and 7B.

The rest of the flowchart in FIG. 7A will be described. In S1001, the CPU 1201 controls the scanner unit 10, reads a document image, and generates image data.

In S1002, the CPU 1201 performs OCR processing on the image data generated in S1001, extracts a character string, and stores the character code corresponding to each extracted character.

In S1003, the CPU 1201 performs pattern matching to determine whether the OCR-processed character string data contains a character string selected as a keyword on the registered keyword screen 2400 in FIG. 11B. In a case where the CPU 1201 determines that a character string that matches one of the character strings selected as keywords on the registered keyword screen 2400 is not contained, i.e., if the CPU 1201 determines that sensitive information is not contained (NO in S1004), the processing proceeds to S1005. On the other hand, in a case where the CPU 1201 determines that a character string that matches one of the character strings selected as keywords on the registered keyword screen 2400 is contained, i.e., if the CPU 1201 determines that sensitive information is contained (YES in S1004), the processing proceeds to S1009.

In a case where image data is registered as a stored keyword, the CPU 1201 determines whether the generated image data contains an image specified by the registered image data. If the generated image data contains an image specified by the registered image data, the CPU 1201 determines that sensitive information is contained.

In S1005, the CPU 1201 determines whether machine learning processing is to be performed. Specifically, the CPU 1201 determines whether the checkbox 2205 on the AI processing setting screen 2200 in FIG. 10B is checked and whether the learning function is set to "ON". If the CPU 1201 determines that the learning function is set to "ON" (YES in S1005), the processing proceeds to S1006. Otherwise (NO in S1005), the processing proceeds to S1007.

In S1006, the CPU 1201 transmits the generated image data to the machine learning server 102. The machine learning server 102 having received the image data performs learning processing based on the image data. Details of the processing will be described below with reference to flowcharts in FIGS. 8A and 8B. While the example in the present exemplary embodiment is described where the machine learning server 102 performs learning processing based on the generated image data, the image processing apparatus 101 may perform learning processing based on the generated image data.

In S1007, the CPU 1201 determines whether estimation processing is to be performed. Specifically, the CPU 1201 determines whether the checkbox 2206 on the AI processing setting screen 2200 in FIG. 10B is checked and whether the estimation function is set to "ON". If the CPU 1201 determines that the estimation function is set to "ON" (YES in S1007), the processing proceeds to S1008. Otherwise (NO in S1007), the processing proceeds to S1015.

In S1008, the CPU 1201 controls the GPU 1291 to perform estimation processing. Details of the estimation processing will be described below with reference to the flowchart in FIG. 7B.

In S1009, the CPU 1201 checks the AI processing OFF setting. Specifically, the CPU 1201 checks a selection state of the checkbox 2205 with respect to the sensitive management information in FIG. 10B.

In S1010, the CPU 1201 determines whether learning processing is to be performed by checking whether the checkbox 2205 in FIG. 10B is checked. If the CPU 1201 determines that learning processing is to be performed (YES in S1010), the processing proceeds to S1011. Otherwise (NO in S1010), the processing proceeds to S1012.

In S1011, the CPU 1201 transmits the generated image data to the machine learning server 102. The machine learning server 102 having received the image data performs learning processing based on the image data. Details of the processing will be described below with reference to the flowcharts in FIGS. 8A and 8B. While the example in the present exemplary embodiment is described where the machine learning server 102 performs learning processing based on the generated image data, the image processing apparatus 101 may perform learning processing based on the generated image data.

In S1012, the CPU 1201 determines whether estimation processing is to be performed by checking whether the checkbox 2206 in FIG. 10B is checked. If the CPU 1201 determines that estimation processing is to be performed (YES in S1012), the processing proceeds to S1013. Otherwise (NO in S1012), the processing proceeds to S1014.

In S1013, the CPU 1201 controls the GPU 1291 to perform estimation processing. Details of the estimation processing will be described below with reference to the flowchart in FIG. 7B.

In S1014, the CPU 1201 erases the OCR data acquired in S1002. The erasing prevents leakage of the sensitive information.

In S1015, the CPU 1201 determines whether the scanned document is the last page. If the CPU 1201 determines that the scanned document is the last page (YES in S1015), the processing proceeds to S1017. Otherwise (NO in S1015), the processing proceeds to S1016.

In S1016, the CPU 1201 prepares to read a next document, and the processing returns to S1001.

In S1017, the CPU 1201 stores the generated image data on the HDD 1204. While the example in the present exemplary embodiment is described where the image data generated by scanning is stored on the HDD 1204 in the image processing apparatus 101, the present exemplary embodiment is not limited to the case. For example, image data generated by scanning may be externally transmitted by email or in a file via a network, or copy processing may be performed to print an image based on image data.

FIG. 7B illustrates an example of an estimation process. The GPU 1291 reads a program stored on the ROM 1203 onto the RAM 1202 and executes the read program to thereby perform the process illustrated in the flowchart in FIG. 7B.

In a case where a learned model is received from the machine learning server 102 (YES in S1301), in S1302, the learned model is recorded, and the learned model to be used in estimation processing is updated. Next, in S1303, data is input to the learned model. In S1304, the estimation processing unit 406 in FIG. 4 estimates sales. In S1305, the UI display unit 402 in FIG. 4 displays the estimation result on the operation unit screen.

Figure 12A:
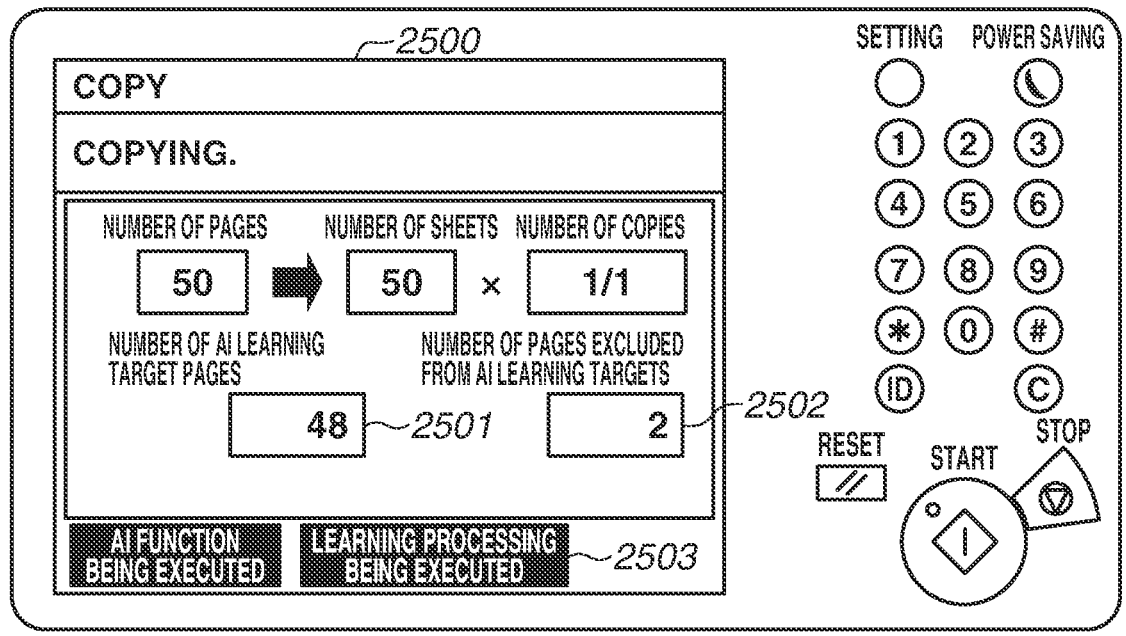
FIGS. 12A and 12B illustrate an example of operation screens.
Figure 12B:
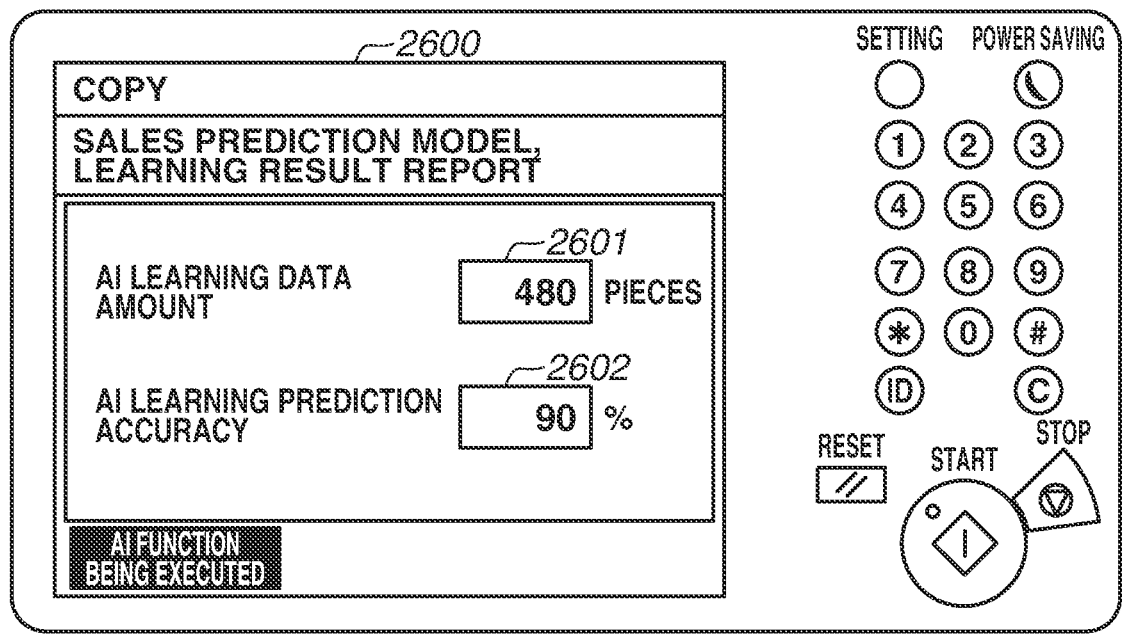

Up to this point, the learning processing and/or the estimation processing are/is set to "OFF" in the AI processing in a case where sensitive information is contained. Thus, an explicit notification of the number of AI-processed pages as a result of the sensitive information detection can be provided to a user via a UI screen as illustrated in FIG. 12A described below.

In the example illustrated in FIG. 7A, even in a case where it is determined that sensitive information is contained, the setting (the checkbox 2205) in FIG. 10B is checked, and if the learning function is set to "ON", learning processing is performed. Furthermore, even in a case where it is determined that sensitive information is contained, the setting (the checkbox 2206) is checked, and if the estimation function is set to "ON", estimation processing is performed. The present exemplary embodiment is not limited to those described above, and learning processing may be controlled not to be performed regardless of the setting (the checkbox 2205) in FIG. 10B in a case where it is determined that sensitive information is contained. Further, estimation processing may be controlled not to be performed regardless of the setting (the checkbox 2206) in FIG. 10B in a case where it is determined that sensitive information is contained.

FIGS. 8A and 8B are flowcharts illustrating an example of a process of the image processing system. FIG. 8A is a flowchart illustrating a feature of operations of the data server 105. In S1101, the data server 105 waits for reception of a data communication request (NO in S1101). If the data server 105 receives a data communication request (YES in S1101), in S1102, whether the type of the request is a request to store data from the image processing apparatus 101 is determined. If the type of the request is a request to store data from the image processing apparatus 101 (YES in S1102), in S1103, the data collection/provision unit 410 in FIG. 4 receives data from the image processing apparatus 101, and in S1104, the data storage unit 411 in FIG. 4 stores the received data. On the other hand, if the data communication request is a request from the machine learning server 102 (NO in S1102), in S1105, the stored data that has not been provided to the machine learning server 102 is transmitted to the machine learning server 102.

As illustrated in FIGS. 7A and 7B, data that contains sensitive information at the image processing apparatus 101 is not transmitted to the data server 105 and is thus not stored, so that the risk of sensitive information leakage from a storage medium is reduced.

FIG. 8B is a flowchart illustrating a feature of operations of the machine learning server 102. In S1201, the machine learning server 102 transmits a request to transmit data for machine learning to the data server 105. Next, in S1202, if data transmitted in response to the request is received (YES in S1202), in S1203, the learning data generation unit 412 in FIG. 4 generates sales prediction learning data. In S1204, the generated data is input to the learning model. In S1205, the machine learning unit 413 in FIG. 4 performs learning. In S1206, the machine learning unit 413 repeats learning until all the pieces of received learning data are input (NO in S1206). When all the pieces of data are input (YES in S1206), in S1207, the learned model is transmitted to the image processing apparatus 101.

As described above, the machine learning server 102 performs learning based on data provided from the data server 105. Thus, learning is performed based on data that does not contain sensitive information, so that the sensitive element is not learned in the learned model. Thus, the risk of sensitive information leakage via a learned model is reduced.

The operational features of the image processing apparatus 101, the data server 105, and the machine learning server 102 of the system according to the present exemplary embodiment are described above. In a case where data included in a document image contains sensitive information, the risk of leakage of the sensitive information is reduced in any of the processes, data transmission, recording, learning model generation, and estimation processing.

<Example of Device Screen>

FIGS. 12A and 12B illustrate an example of operation screens. FIG. 12A illustrates an example of an operation screen and is an example of an AI processing details notification screen 2500. The screen 2500 provides a notification of details of the AI processing being executed in the background during a copy operation. In the illustrated example, an AI processing result at the end of printing one copy of a 50 page document is displayed. A display section 2501 displays "48" as the number of pages determined as AI learning targets among the 50 pages of document images. A display section 2502 displays "2" as the number of pages excluded from the AI learning targets. The above-described notifications are displayed so that a user can recognize the number of pages determined as AI processing targets and the number of pages not determined as AI processing targets with respect to the total number of pages in a copy job. Further, the screen 2500 includes a status icon 2503 indicating whether learning processing is currently being executed in the background so that a user can recognize a state of AI processing being executed independently in the background during a copy job.

FIG. 12B illustrates an example of an operation screen and illustrates an example of the learning result screen 2600 that displays a learning result. The learning result screen 2600 is a screen that displays information that is provided so that a user can recognize the amount of learning data in AI processing and the learning accuracy. As illustrated in FIG. 12B, an AI learning amount display section 2601 displays "480 pieces", and an AI learning prediction accuracy section 2602 displays a numerical value in percentage as an evaluation index of a learning result using the learning model illustrated in FIGS. 5A and 5B, whereby notifications are provided so that a user can recognize the amount of learning and the prediction accuracy.

Further, the notifications may be in numerical values or in the form of a graph and may be configured so that a user can recognize transition states of the data amount and learning accuracy.

Figure 13:
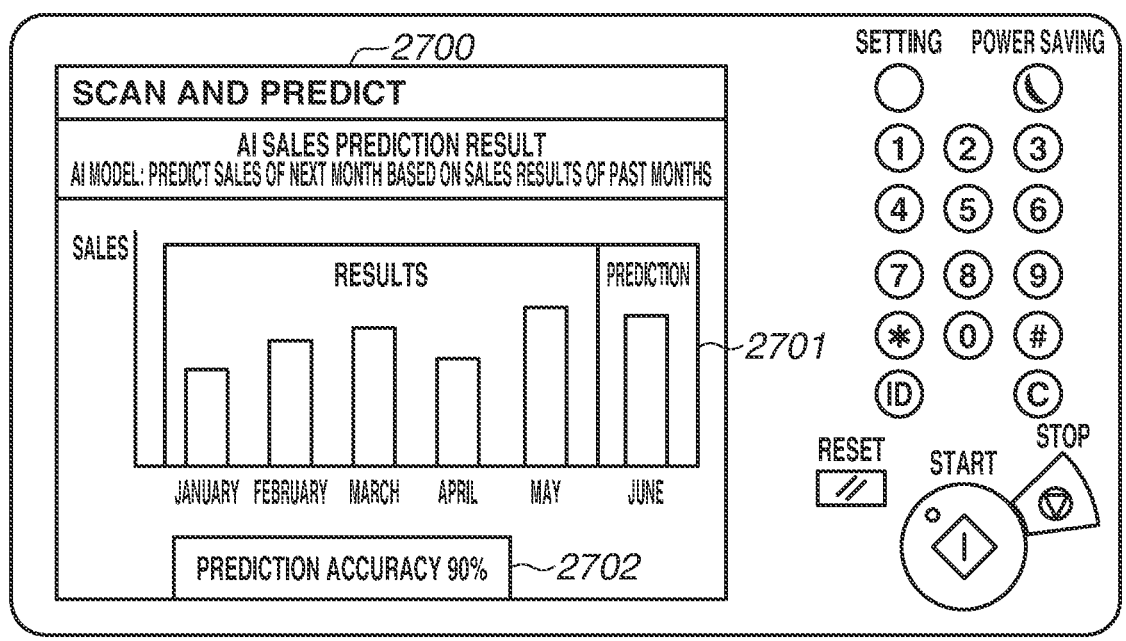
FIG. 13 illustrates an example of an operation screen.

FIG. 13 illustrates an example of an operation screen and illustrates an example of an estimation result display screen 2700 that displays an estimation result in the AI function in S1305 in FIG. 7B. The estimation result display screen 2700 includes an estimation processing result display section 2701 and an estimation processing information display section 2702 and can display a prediction accuracy as supplementary information about the estimation processing result.

A second exemplary embodiment will be described below. Whereas the machine learning processing is performed using the data server 105 and the machine learning server 102 in the first exemplary embodiment, the image processing apparatus 101 includes the functions of the data server 105 and the machine learning server 102 in the present exemplary embodiment.

Figure 14:
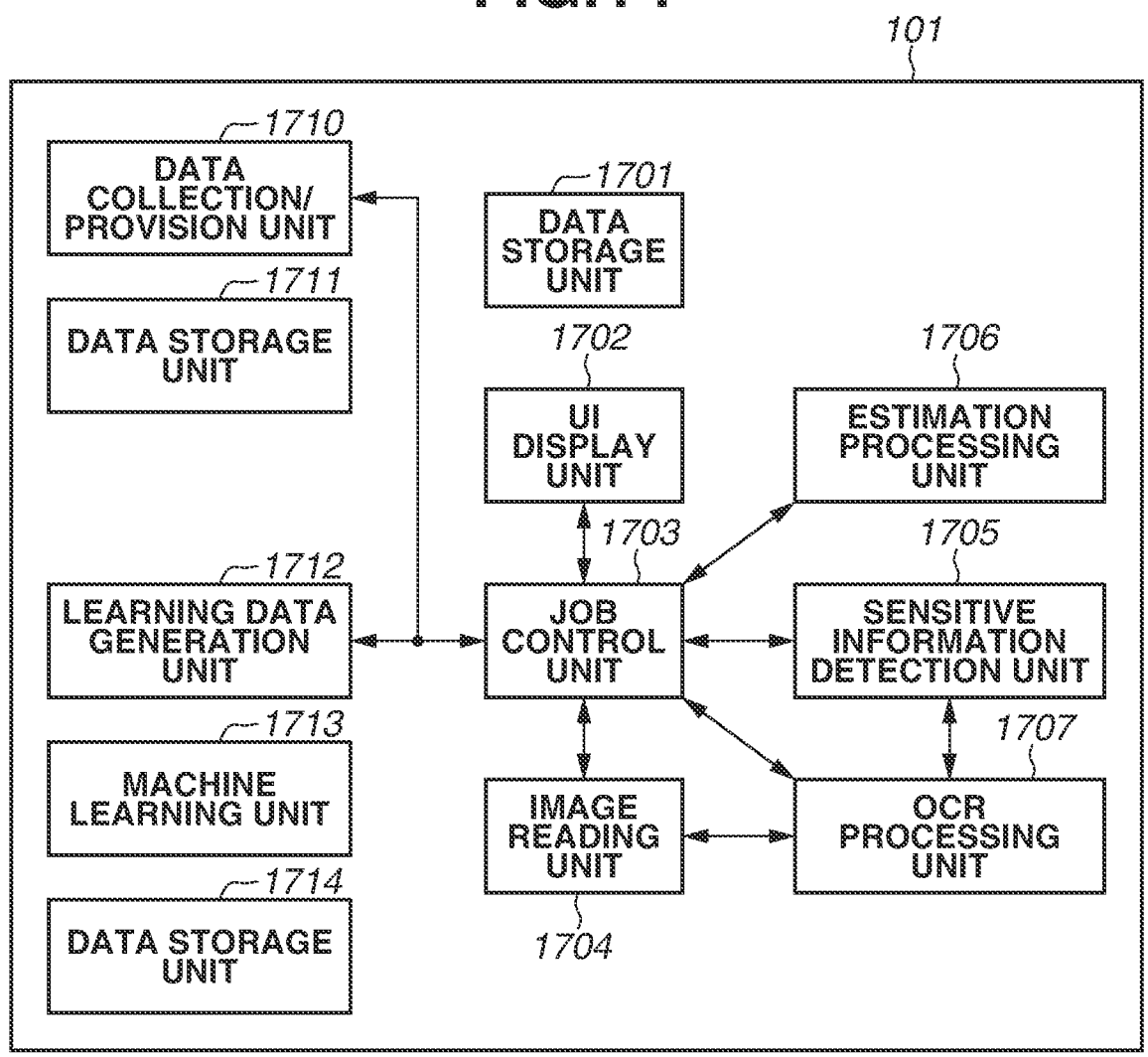
FIG. 14 illustrates an example of a software configuration of the image processing apparatus.

FIG. 14 illustrates an example of a software configuration of the image processing apparatus 101. FIG. 14 mainly illustrates differences from FIG. 4. While the data server 105 includes the data collection/provision unit 410 and the data storage unit 411 in FIG. 4, the image processing apparatus 101 includes a data collection/provision unit 1710 and a data storage unit 1711 in FIG. 14. Whereas the machine learning server 102 includes the learning data generation unit 412, the machine learning unit 413, and the data storage unit 414 in FIG. 4, the image processing apparatus 101 includes a learning data generation unit 1712, a machine learning unit 1713, and a data storage unit 1714 in FIG. 14.

<Operation Process of System According to Present Exemplary Embodiment>

Figure 15A:
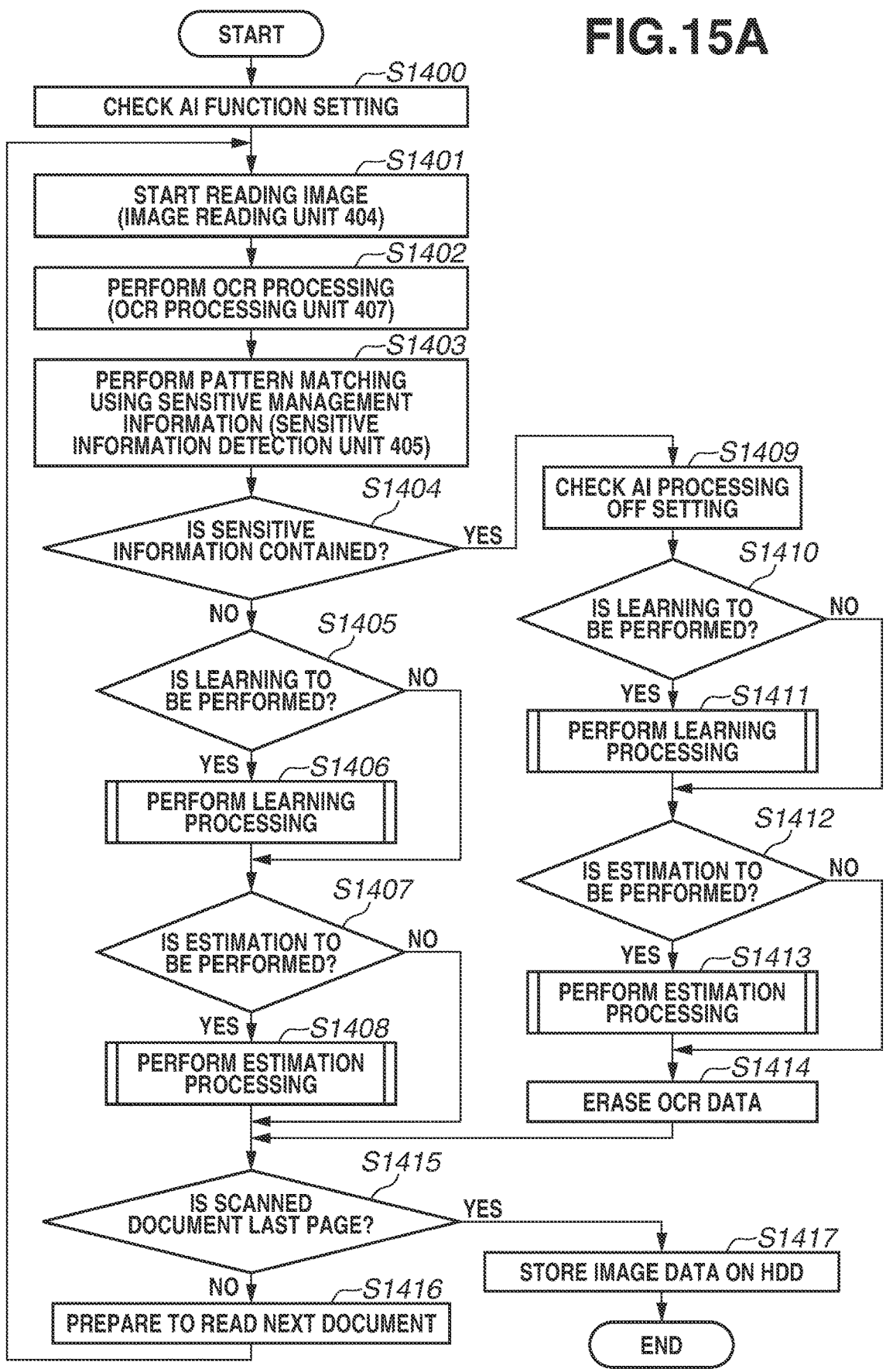

FIG. 15A is a flowchart illustrating an example of a process of the AI function. FIG. 15A is a flowchart illustrating an example of a process in execution of the AI function. The CPU 1201 reads a program stored on the ROM 1203 onto the RAM 1202 and executes the read program to thereby execute the process illustrated in the flowchart in FIG. 15A. The process in FIG. 15A is started if the "scan and AI prediction" button on the home screen displayed on the touch panel 11 illustrated in FIG. 9A described below is selected. Differences between the processes in FIGS. 15A and 7A will be mainly described below.

In the second exemplary embodiment, the image processing apparatus 101 internally performs data collection and learning, so that FIG. 15A is different in that basically a process of transmitting and receiving data to and from an external server is internally performed, and the rest of the process is similar. Specifically, whereas data is transmitted to the machine learning server 102 in S1006 in FIG. 7A, the image processing apparatus 101 internally performs learning processing in S1406 in FIGS. 15A to 15C. An estimation process illustrated in FIG. 15B is similar to that illustrated in FIG. 7B, and descriptions thereof are omitted. Further, a learning process illustrated in FIG. 15C is different in that the learning process does not include S1201 of transmitting a data transmission request, S1202 of checking data reception, or S1207 of transmitting a learned model to the image processing apparatus 101 in FIG. 8B. With the image processing apparatus 101 configured to internally perform a series of learning and estimation processing, the system according to the present exemplary embodiment is applicable without playing the role of the data collection/provision unit 1710.

Other Exemplary Embodiments

Some embodiments can be realized by the following processing. Specifically, a program that performs one or more functions of the above-described exemplary embodiments is fed to a system or apparatus via a network or storage medium, and one or more processors of a computer of the system or apparatus read the program and execute the read program. Some embodiments can also be realized by a circuit (e.g., application-specific integrated circuit (ASIC)) that performs one or more functions.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-196658, which was filed on Oct. 29, 2019 and which is hereby incorporated by reference herein in its entirety.

What is claimed is:

1. An image processing apparatus comprising:
one or more memories storing instructions; and
one or more processors that implement the instructions stored in the one or more memories to:
receive image data;
perform machine learning processing using information contained in the received image data;
output an estimation result based on information contained in image data using a learning model generated by the machine learning processing; and
set a predetermined setting,
wherein in a case where the predetermined setting is set, the machine learning processing is not performed on at least sensitive information contained in the received image data, and
wherein in a case where the predetermined setting is not set, the machine learning processing is performed on at least the sensitive information contained in the received image data.

2. The image processing apparatus according to claim 1,
wherein the one or more processors set another setting different from the predetermined setting,
wherein in a case where the another setting is set, the one or more processors do not output an estimation result based on sensitive information contained in the received image data, and
wherein in a case where the another setting is not set, the one or more processors output the estimation result based on sensitive information contained in the received image data.

3. The image processing apparatus according to claim 1,
wherein the one or more processors receive a character string input by a user,
wherein in a case where the predetermined setting is set, the machine learning processing is not performed on the received image data containing the input character string, and
wherein in a case where the predetermined setting is not set, the machine learning processing is performed on the received image data containing the input character string.

4. The image processing apparatus according to claim 3,
wherein the one or more processors perform character recognition processing to recognize a character string contained in the received image data, and
wherein the one or more processors determine, based on a result of the character recognition processing, whether the input character string is contained in the received image data.

5. The image processing apparatus according to claim 4,
wherein the one or more processors store the character string acquired by the character recognition processing to a storage, and
wherein in a case where the predetermined setting is set, the one or more processors do not store, to the storage, the character string acquired by the character recognition processing on the received image data containing the input character string.

6. The image processing apparatus according to claim 1,
wherein the one or more processors register image data,
wherein in a case where the predetermined setting is set, the machine learning processing is not performed on the received image data containing an image of the registered image data, and
wherein in a case where the predetermined setting is not set, the machine learning processing is performed on the received image data containing the image of the registered image data.

7. The image processing apparatus according to claim 1, further comprising a display,
wherein the one or more processors display the estimation result on the display.

8. The image processing apparatus according to claim 7, wherein the one or more processors display information indicating that an artificial intelligence (AI) function is being executed when the machine learning processing is performed.

9. An image processing method comprising:
receiving image data;
performing machine learning processing using information contained in the received image data;
outputting an estimation result based on information contained in image data using a learning model generated by the machine learning processing; and
setting a predetermined setting;
wherein in a case where the predetermined setting is set, the machine learning processing is not performed on at least sensitive information contained in the received image data, and
wherein in a case where the predetermined setting is not set, the machine learning processing is performed on at least the sensitive information contained in the received image data.

10. The image processing method according to claim 9, further comprising:
setting another setting different from the predetermined setting,
wherein in a case where the another setting is set, an estimation result based on sensitive information contained in the received image data is not output, and
wherein in a case where the another setting is not set, the estimation result based on sensitive information contained in the received image data is output.

11. The image processing method according to claim 9, further comprising receiving a character string input by a user,
wherein in a case where the predetermined setting is set, the machine learning processing is not performed on the received image data containing the input character string, and
wherein in a case where the predetermined setting is not set, the machine learning processing is performed on the received image data containing the input character string.

12. The image processing method according to claim 11, further comprising performing character recognition processing to recognize a character string contained in the received image data; and
determining, based on a result of the character recognition processing, whether the input character string is contained in the received image data.

13. The image processing method according to claim 12, further comprising storing the character string acquired by the character recognition processing to a storage,
wherein in a case where the predetermined setting is set, the character string acquired by the character recognition processing on the image data containing the input character string is not stored to the storage.

14. The image processing method according to claim 9, further comprising registering the input image data,
wherein in a case where the predetermined setting is set, the machine learning processing is not performed on the received image data containing an image of the registered image data, and
wherein in a case where the predetermined setting is not set, the machine learning processing is performed on the received image data containing the image of the registered image data.

15. The image processing method according to claim 9, wherein the output estimation result is displayed on a display.

16. The image processing method according to claim 15, wherein information indicating that an artificial intelligence (AI) function is being executed is displayed on the display when the machine learning processing is performed.

17. A non-transitory computer-readable storage medium storing a program that, when executed by a computer, causes the computer to perform an image processing method, the image processing method comprising:
receiving image data;
performing machine learning processing using information contained in the received image data;
outputting an estimation result based on information contained in image data using a learning model generated by the machine learning processing; and
setting a predetermined setting;
wherein in a case where the predetermined setting is set, the machine learning processing is not performed on at least sensitive information contained in the received image data, and
wherein in a case where the predetermined setting is not set, the machine learning processing is performed on at least the sensitive information contained in the received image data.

* * * * *